United States Patent
Yoshida et al.

(10) Patent No.: US 12,530,785 B2
(45) Date of Patent: Jan. 20, 2026

(54) TRACKING DEVICE, TRACKING METHOD, AND RECORDING MEDIUM

(71) Applicant: NEC Corporation, Tokyo (JP)

(72) Inventors: Noboru Yoshida, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 451 days.

(21) Appl. No.: 17/928,394

(22) PCT Filed: Jun. 1, 2020

(86) PCT No.: PCT/JP2020/021605
§ 371 (c)(1),
(2) Date: Nov. 29, 2022

(87) PCT Pub. No.: WO2021/245749
PCT Pub. Date: Dec. 9, 2021

(65) Prior Publication Data
US 2023/0206468 A1  Jun. 29, 2023

(51) Int. Cl.
*G06T 7/246* (2017.01)
*G06V 20/52* (2022.01)

(52) U.S. Cl.
CPC .............. *G06T 7/246* (2017.01); *G06V 20/52* (2022.01)

(58) Field of Classification Search
CPC ...... G06V 20/52; G06V 20/46; G06V 10/764; G06T 2207/30232; G06T 2207/30196; G06T 2207/10016; G06T 7/20; G06T 7/292
See application file for complete search history.

(56) References Cited

U.S. PATENT DOCUMENTS

2018/0374221 A1* 12/2018 Komoto .................. G06T 7/00

FOREIGN PATENT DOCUMENTS

| JP | 2004046647 A | * | 2/2004 |
| JP | 2008-259161 A | | 10/2008 |
| JP | 2012-159957 A | | 8/2012 |
| JP | 2015-053032 A | | 3/2015 |
| WO | 2011/021588 A1 | | 2/2011 |
| WO | 2015/098442 A1 | | 7/2015 |
| WO | 2016/098720 A1 | | 6/2016 |

OTHER PUBLICATIONS

International Search Report for PCT Application No. PCT/JP2020/021605, mailed on Sep. 1, 2020.
English translation of Written opinion for PCT Application No. PCT/JP2020/021605, mailed on Sep. 1, 2020.

* cited by examiner

Primary Examiner — Sumati Lefkowitz
Assistant Examiner — Connor L Hansen

(57) ABSTRACT

A tracking device including a designation range acquisition unit that acquires a designation range designated for each of a plurality of image frames constituting video data, a tracking unit that extracts the image frame to be verified from the video data, detect a tracking target for each of the extracted image frames, set a collation range for the detected tracking target, and adjust the collation range based on the designation range set for each of the image frames, and a display information generation unit that generates, for each of the image frames, a tracking image in which the collation range is associated with the tracking target.

9 Claims, 25 Drawing Sheets

TRACKING DEVICE, TRACKING METHOD, AND RECORDING MEDIUM

This application is a National Stage Entry of PCT/JP2020/021605 filed on Jun. 1, 2020, the contents of all of which are incorporated herein by reference, in their entirety.

TECHNICAL FIELD

The present invention relates to a tracking device or the like that tracks a tracking target.

BACKGROUND ART

The person tracking technique is a technique for detecting a person from an image frame constituting a moving image captured by a monitoring camera and tracking the detected person. In the person tracking technique, for example, each detected person is identified by face authentication or the like, an identification number is assigned, and a person assigned with the identification number is tracked in image frames that are consecutive in time series. In a general person tracking technique, when there is an image frame at a time point when a person being tracked (also referred to as a person to be tracked) intersects with an obstacle or the like, a person to be tracked may be replaced in an image frame at a subsequent time point, or the person to be tracked may be detected as a new person.

PTL 1 discloses a setting device that dynamically sets a frequency in which it is determined whether an object in a moving image is a predetermined object. When determining that the object in the moving image is the predetermined object, the device of Patent Literature 1 sets the determination frequency to be lower than before.

CITATION LIST

Patent Literature

[PTL 1] JP 2015-053032 A

SUMMARY OF INVENTION

Technical Problem

According to the method of PTL 1, by dynamically changing the frequency in which it is determined whether an object in a moving image is a predetermined object based on a rule designated in advance, it is possible to accurately determine whether the object in the moving image is a predetermined object. However, in the method of PTL 1, in a case where an object in a moving image crosses an obstacle or the like, the same object is likely to be identified as a different object before and after the object crosses the obstacle, and accuracy of tracking is likely to decrease. In the method of PTL 1, the same object is easily identified as a different object between images captured by a plurality of cameras, and is not suitable for tracking an object over a wide range.

An object of the present invention is to provide a tracking device or the like capable of accurately tracking a tracking target in accordance with a scene in real space.

Solution to Problem

A tracking device according to an aspect of the present invention includes a designation range acquisition unit that acquires a designation range designated for each of a plurality of image frames constituting video data, a tracking unit that extracts the image frame to be verified from the video data, detect a tracking target for each of the extracted image frames, set a collation range for the detected tracking target, and adjust the collation range based on the designation range set for each of the image frames, and a display information generation unit that generates, for each of the image frames, a tracking image in which the collation range is associated with the tracking target.

In a tracking method according to an aspect of the present invention, the method executed by a computer includes acquiring a designation range designated for each of a plurality of image frames constituting video data, extracting the image frame to be verified from the video data, detecting a tracking target for each of the extracted image frames, setting a collation range for the detected tracking target, adjusting the collation range based on the designation range set for each of the image frames, and generating, for each of the image frames, a tracking image in which the collation range is associated with the tracking target.

A program according to an aspect of the present invention causes a computer to execute a process of acquiring a designation range designated for each of a plurality of image frames constituting video data, a process of extracting the image frame to be verified from the video data, a process of detecting a tracking target for each of the extracted image frames, a process of setting a collation range for the detected tracking target, a process of adjusting the collation range based on the designation range set for each of the image frames, and a process of generating, for each of the image frames, a tracking image in which the collation range is associated with the tracking target.

Advantageous Effects of Invention

According to the present invention, it is possible to provide a tracking device or the like capable of accurately tracking a tracking target in accordance with a scene in real space.

EXAMPLE EMBODIMENT

Figure 1:
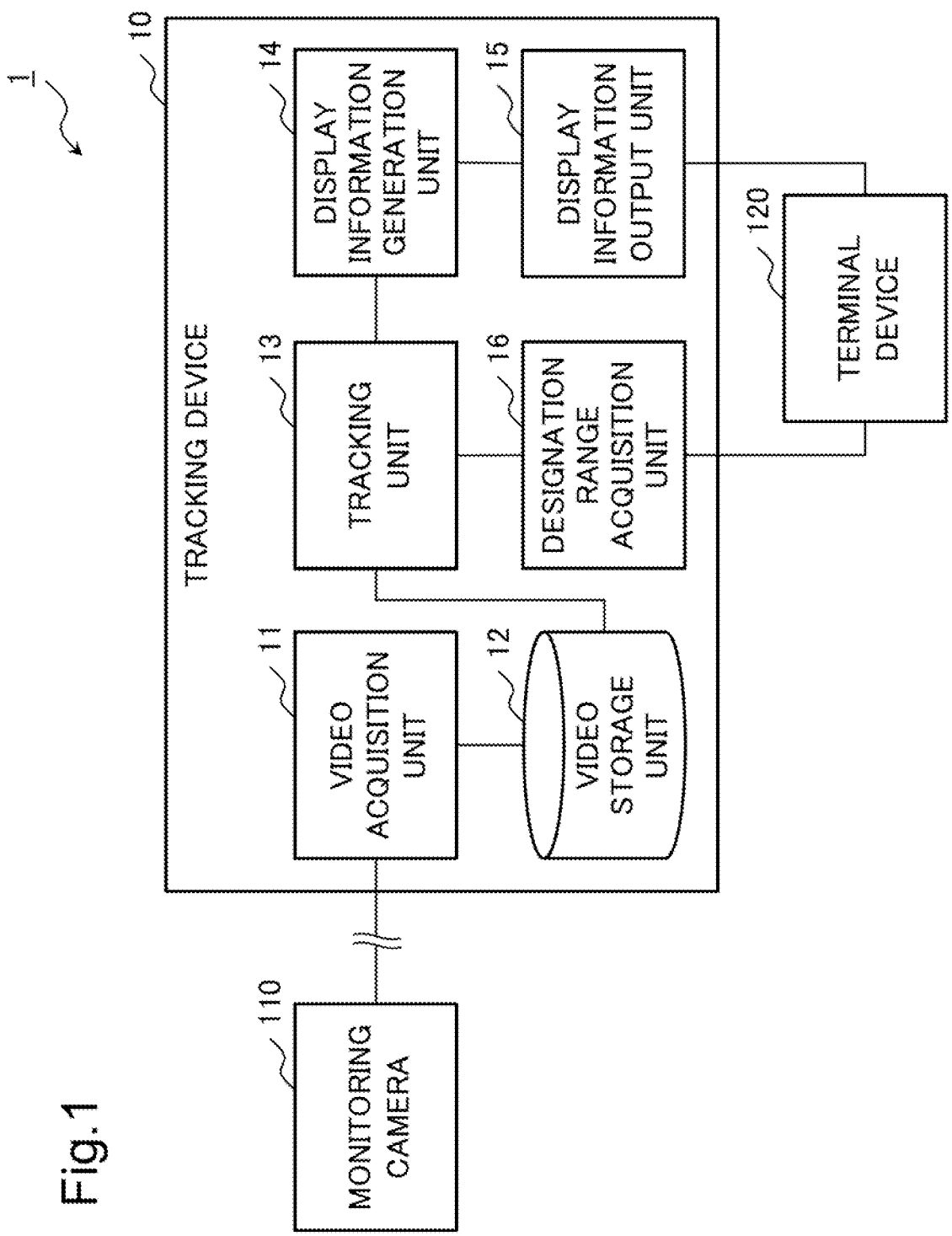
FIG. 1 is a block diagram illustrating an example of a configuration of a tracking system according to a first example embodiment.

Hereinafter, embodiments of the present invention will be described with reference to the drawings. However, the example embodiments described below have technically preferable limitations for carrying out the present invention, but the scope of the invention is not limited to the following. In all the drawings used in the following description of the example embodiment, the same reference numerals are given to the same parts unless there is a particular reason. In the following example embodiments, repeated description of similar configurations and operations may be omitted. The directions of the arrows in the drawings illustrate an example, and do not limit the directions of signals and the like between blocks.

First Example Embodiment

First, a tracking device according to the first example embodiment will be described with reference to the drawings. The tracking device according to the present example embodiment detects a tracking target such as a person from an image (also referred to as an image frame) constituting a moving image captured by a monitoring camera or the like, and tracks the detected tracking target. The tracking target of the tracking device according to the present example embodiment is not particularly limited. For example, the tracking device according to the present example embodiment may track not only a person but also an animal such as a dog or a cat, a moving object such as an automobile, a bicycle, or a robot, any objects, or the like. The tracking device according to the present example embodiment uses a range (also referred to as a designation range) designated by the user for calculation and sets the collation range associated with the tracking target detected from the image frame. The collation range is a range in a real space associated with the tracking target detected from the image frames, and is used for collation of the tracking target between consecutive image frames. For example, the collation range is set as a sphere or a circle centered on the tracking target. For example, between consecutive image frames, a tracking target in which at least respective parts of the collation ranges overlaps with each other or a tracking target in which the collation ranges are close to each other is the collation target. The tracking device according to the present example embodiment sets the collation range of the tracking target in such a way as to exclude a designation range (referred to as an exclusion range) set in association with an obstacle or the like in an image frame.

(Configuration)

FIG. 1 is a block diagram illustrating an example of a configuration of a tracking system 1 of the present example embodiment. The tracking system 1 includes a tracking device 10, a monitoring camera 110, and a terminal device 120. Although only one monitoring camera 110 and only one terminal device 120 are illustrated in FIG. 1, a plurality of monitoring cameras 110 and a plurality of terminal devices 120 may be provided.

The monitoring camera 110 is disposed at a position where a range to be monitored can be imaged. Monitoring camera 110 has a function of a general monitoring camera. The monitoring camera 110 may be a camera sensitive to a visible region or an infrared camera sensitive to an infrared region. For example, the monitoring camera 110 is disposed on a street or in a room with many people. A connection method between the monitoring camera 110 and the tracking device 10 is not particularly limited. For example, the monitoring camera 110 is connected to the tracking device 10 via a network such as the Internet or an intranet.

The monitoring camera 110 images the range to be monitored at a preset imaging interval, and generates video data. The monitoring camera 110 outputs the generated video data to the tracking device 10. The video data includes a plurality of pieces of image data (also referred to as image frames) imaged at set imaging intervals. The timing at which the monitoring camera 110 outputs data to the tracking device 10 is not particularly limited. For example, the monitoring camera 110 may output video data constituted by a plurality of image frames to the tracking device 10, or may output each of the plurality of image frames to the tracking device 10 in chronological imaging order.

The tracking device 10 includes a video acquisition unit 11, a video storage unit 12, a tracking unit 13, a display information generation unit 14, a display information output unit 15, and a designation range acquisition unit 16. For example, the tracking device 10 is disposed on a server or a cloud. For example, the tracking device 10 may be provided as an application installed in the terminal device 120.

The video acquisition unit 11 acquires the video data to be processed from the monitoring camera 110. The video acquisition unit 11 stores the acquired video data in the video storage unit 12. The timing at which the tracking device 10 acquires data from the monitoring camera 110 is not particularly limited. For example, the video acquisition unit 11 may acquire the video data constituted by the plurality of image frames from the monitoring camera 110, or may acquire each of the plurality of image frames from the monitoring camera 110 in the imaging order. The video acquisition unit 11 may acquire not only video data generated by the monitoring camera 110 but also video data stored in an external storage, a server, or the like (not illustrated).

The video storage unit 12 stores video data generated by the monitoring camera 110. The image frames constituting the video data stored in the video storage unit 12 are acquired by the tracking unit 13 and used for tracking the tracking target.

The tracking unit 13 stores a spatial threshold value and a time threshold value. The spatial threshold value is a spatial threshold value set in association with the tracking target detected from the target image frame to be verified (also referred to as a verification frame). The time threshold value is a reference for extracting an image frame to be collated with a verification frame to be verified from video data constituted by a plurality of image frames. The spatial threshold value and the time threshold value are preset values. The spatial threshold value and the time threshold value may be changeable according to a user's operation. For example, the spatial threshold value and the time threshold value may be commonly set for all image frames constituting the video data, or may be set for each image frame.

The spatial threshold value is a value related to the collation range of the tracking target. For example, when the collation range is a circle, the spatial threshold value is set as the diameter or the radius of the collation range. The spatial threshold value is adjusted according to the size of the tracking target in the verification frame. For example, the spatial threshold value is set as a value based on the size of the tracking target in the verification frame. For example, in a case where the tracking target is a person, the spatial threshold value is set as a ratio based on the height of the person. For example, a circle having a diameter or a radius of a value obtained by multiplying the height of the person to be tracked by the spatial threshold value is set as the collation range. The spatial threshold value may be set as the number of pixels of the verification frame or the like instead of the ratio based on the height of the person.

The time threshold value is a temporal threshold value for setting how many image frames (image frames corresponding to how many seconds) before the verification frame are collated with the verification frame among image frames constituting video data. The time threshold value corresponds to the maximum value of the time traced when the tracking target is collated with the time of the verification frame as a reference. The image frames to be collated with the verification frame are image frames from an image frame related to the time of the time threshold value to an image frame immediately before the verification frame. For example, the time threshold value is set as the number of frames indicating that how many image frames (image frames corresponding to how many seconds) before the verification frame are collated with the verification frame among image frames constituting video data. For example, in a case where the time threshold value is 10 frames, image frames of 10 frames in total, represented by the first frame, the second frame, . . . , the tenth frame, before the image frame are collated with the verification frames. The time threshold value may be a value obtained by converting the number of frames into time.

The tracking unit 13 tracks the tracking target by collating the tracking target detected in the verification frame with the tracking target detected in the image frames to be collated with the verification frame.

The tracking unit 13 acquires the verification frame from the video storage unit 12. The tracking unit 13 detects the tracking target from the acquired verification frame. For example, the tracking unit 13 detects the tracking target from the verification frame by a detection technique such as a background differencing technique. For example, the tracking unit 13 may detect the tracking target from the verification frame by a detection technique using a feature amount such as a motion vector. The tracking target of the tracking unit 13 is a person or an object that moves (also referred to as a moving object). For example, in a case where the tracking target is a person, the tracking unit 13 detects the tracking target from the verification frame using a face detection technique or the like. For example, the tracking unit 13 may detect the tracking target from the verification frame using human body detection, object detection, or the like. For example, the tracking unit 13 may detect an object that is not a moving object but has a feature amount such as a shape, a pattern, or a color that changes in a certain position. For example, the tracking unit 13 collates the tracking target detected from consecutive verification frames using a technique such as face authentication or gait authentication.

Among the tracking targets detected in the image frames extracted based on the time threshold value, the tracking unit 13 collates the tracking target temporally and spatially close to the tracking target detected from the verification frame. When the degree of matching between the tracking targets is high, the tracking unit 13 determines that the tracking targets are the same and assigns the same identification number. In the present example embodiment, the collation method of the tracking target by the tracking unit 13 is not particularly limited. For example, in a case where the tracking target is a person, the tracking unit 13 collates the tracking target using a technology of face authentication or gait authentication. For example, the tracking unit 13 may collate the tracking target based on features such as the entire body of the person, the color of the clothes, the posture, and the belongings detected from the verification frame. For example, the tracking unit 13 assigns a provisional identification number to the tracking target detected in the verification frame, and assigns a formal identification number to the tracking target detected in the verification frame after collation with the tracking target detected in the image frame extracted based on the time threshold value is obtained. The tracking unit 13 assigns a new identification number to a tracking target that is not detected in the image frame extracted based on the time threshold value but is newly detected in the verification frame. For example, the tracking unit 13 predicts the position of the tracking target in the verification frame based on the tracking information in the image frame extracted based on the time threshold value, and assigns the same identification number to the tracking target located in the vicinity of the predicted position on the screen. The tracking information is information in which an identification number of the tracking target, a position, a size, a speed, and the like of the tracking target in the image frame are associated with the tracking target detected from the image frame.

The tracking unit 13 generates tracking information in which an identification number of the tracking target, a position, a size, a speed, and the like of the tracking target in the image frame are associated with the tracking target detected from the verification frame. The tracking unit 13 sets the collation range based on the spatial threshold value in association with the position of the tracking target according to the size of the tracking target in the image frame.

When the exclusion range is set in the image frame, the tracking unit 13 perform setting in such a way as to move a portion, of the collation range associated with the tracking target, overlapping with the exclusion range to a position opposite to a position of the collation range with respect to the exclusion range. For example, when the exclusion range crosses the collation range, the tracking unit 13 divides the collation range into two with the exclusion range interposed therebetween. For example, when the exclusion range does not cross the collation range, a portion, of the collation range, overlapping with the exclusion range is set to a position opposite to a position of the collation range with respect to the exclusion range. For example, when the collation range is placed beyond the exclusion range from the beginning, the tracking unit 13 sets a portion, of the collation range, obtained by combining a portion overlapping with the exclusion range and a portion placed beyond the exclusion range at a position opposite to a position of the collation range with respect to the exclusion range. For example, when the collation range is placed beyond the exclusion range from the beginning, the tracking target can be tracked based on a portion placed beyond the exclusion range, so that the collation range may be used as it is.

The tracking unit 13 adds the set collation range to the tracking information. For example, the tracking unit 13 may estimate the tracking information related to each image frame based on the position, the size, the speed, and the like of the tracking target. The tracking unit 13 outputs the tracking information for each image frame constituting the video data to the display information generation unit 14.

The display information generation unit 14 acquires the tracking information for each of the plurality of image frames constituting the video data from the tracking unit 13. Using the acquired tracking information, the display information generation unit 14 generates display information including a tracking image in which a collation range is associated with a tracking target in an image frame, and an operation image for setting a time threshold value and a spatial threshold value. The display information generated by the display information generation unit 14 is a graphical user interface (GUI) displayed on the terminal device 120 referred to by the user. The display information generation unit 14 outputs the generated display information to the display information output unit 15.

The display information output unit 15 acquires a GUI for each image frame constituting the video data from the display information generation unit 14. The display information output unit 15 outputs the display information for each image frame to the terminal device 120. The display information for each image frame is displayed as a GUI on the screen referred to by the user.

The designation range acquisition unit 16 acquires the designation range (exclusion range) designated by the user from the terminal device 120. The designation range acquisition unit 16 outputs the acquired exclusion range to the tracking unit 13.

Figure 2:
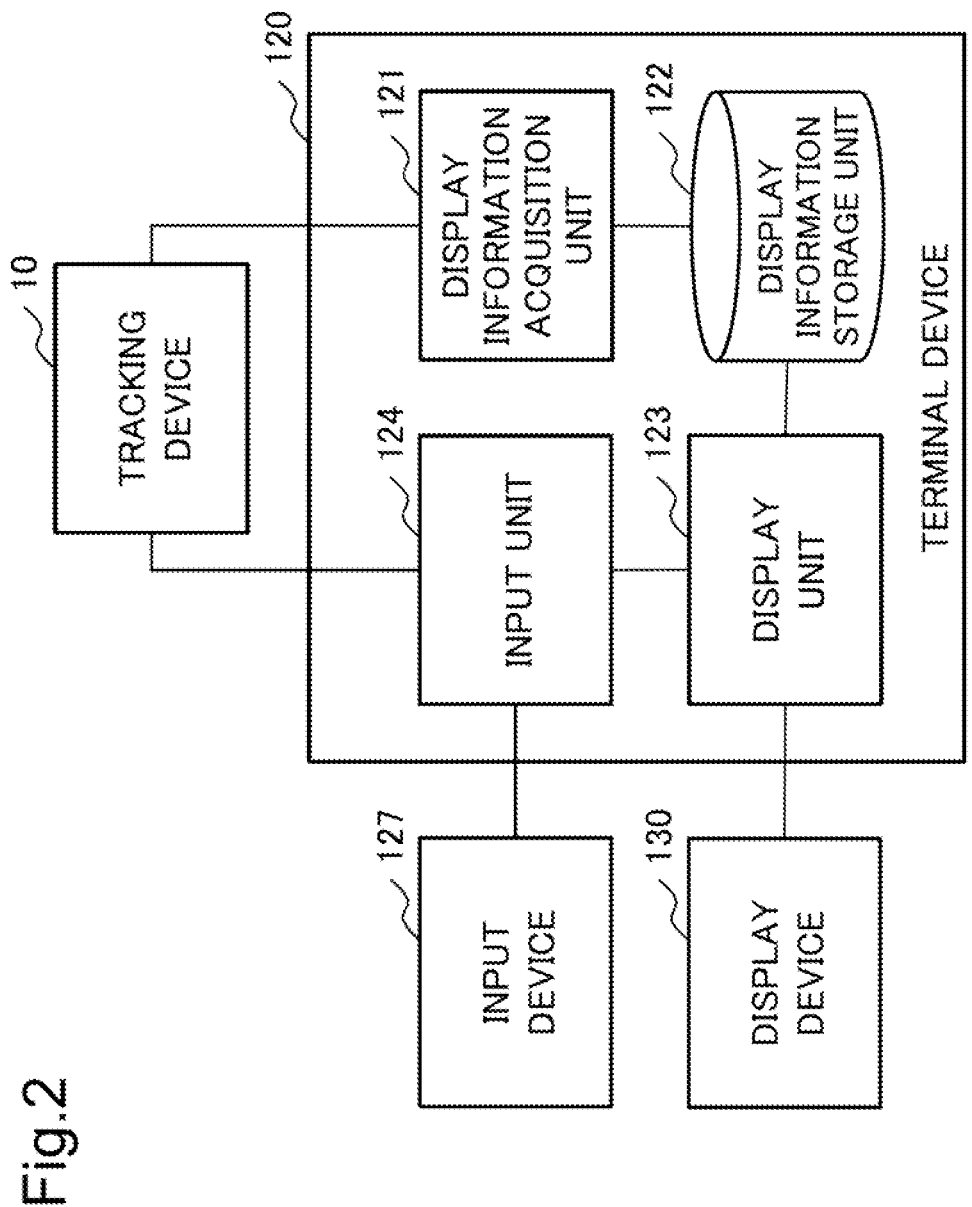
FIG. 2 is a block diagram illustrating an example of a configuration of a terminal device included in the tracking system according to the first example embodiment.

FIG. 2 is a block diagram illustrating an example of a configuration of the terminal device 120 and the like. The terminal device 120 includes a display information acquisition unit 121, a display information storage unit 122, a display unit 123, and an input unit 124. FIG. 2 also illustrates the tracking device 10, an input device 127, and a display device 130 connected to the terminal device 120.

The display information acquisition unit 121 acquires the tracking information for each of the plurality of image frames constituting the video data from the tracking device 10. The display information acquisition unit 121 stores the tracking information for each image frame in the display information storage unit 122.

The display information storage unit 122 stores the display information generated by the display information generation unit 14. The display information stored in the display information storage unit 122 is displayed as a GUI on the screen of the display unit 123 according to, for example, a user's operation or the like.

The display unit 123 is connected to the display device 130 having a screen. The display unit 123 acquires the display information from the display information storage unit 122. The display unit 123 displays the acquired display information on the screen of the display device 130. The terminal device 120 may include the function of the display device 130.

For example, the display unit 123 receives an operation by the user via the input unit 124, and displays display information related to the received operation content on the screen of the display device 130. For example, the display unit 123 displays the display information related to the image frame with the frame number (frame #) designated by the user on the screen of the display device 130. For example, the display unit 123 displays display information related to each of a plurality of series of image frames including an image frame with a frame #designated by the user on the screen of the display device 130 in chronological order.

For example, the display unit 123 may display at least one piece of display information on the screen of the display device 130 according to a preset display condition. For example, the preset display condition is a condition that a plurality of pieces of display information related to a predetermined number of consecutive image frames including a preset frame # is displayed in chronological order. For example, the preset display condition is a condition that a plurality of pieces of display information related to a plurality of image frames generated in a predetermined time zone including a preset time is displayed in chronological order. The display condition is not limited to the example described herein as long as it is set in advance.

The input unit 124 is connected to the input device 127 that receives an operation by a user. For example, the input device 127 is achieved by a device having a pointing function such as a touch panel or a mouse. The input unit 124 outputs the operation content by the user input via the input device 127 to the tracking device 10. When receiving designation of video data, an image frame, display information, and the like from the user, the input unit 124 outputs an instruction to display the designated image on the screen to the display unit 123.

Figure 3:
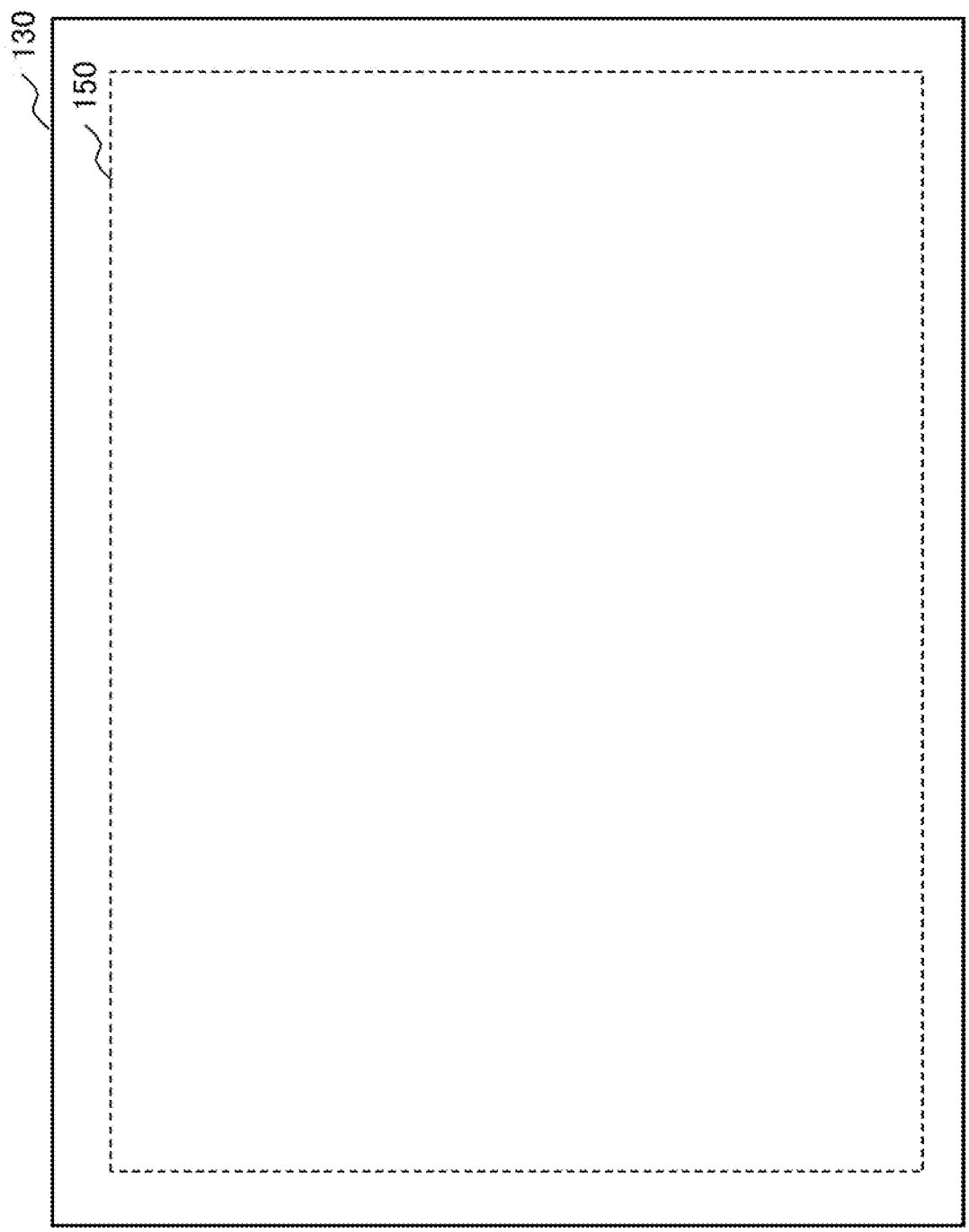
FIG. 3 is a conceptual diagram illustrating an example of a display region set on a screen of a display device connected to a terminal device included in the tracking system according to the first example embodiment.

FIG. 3 is a conceptual diagram for describing display information displayed on a screen of the display device 130. An image display region 150 is set on the screen of the display device 130. In the image display region 150, a tracking image for each image frame is displayed. A display region other than the image display region 150 may be set on the screen of the display device 130. The display position of the image display region 150 on the screen can be changed to any position.

Figure 4:
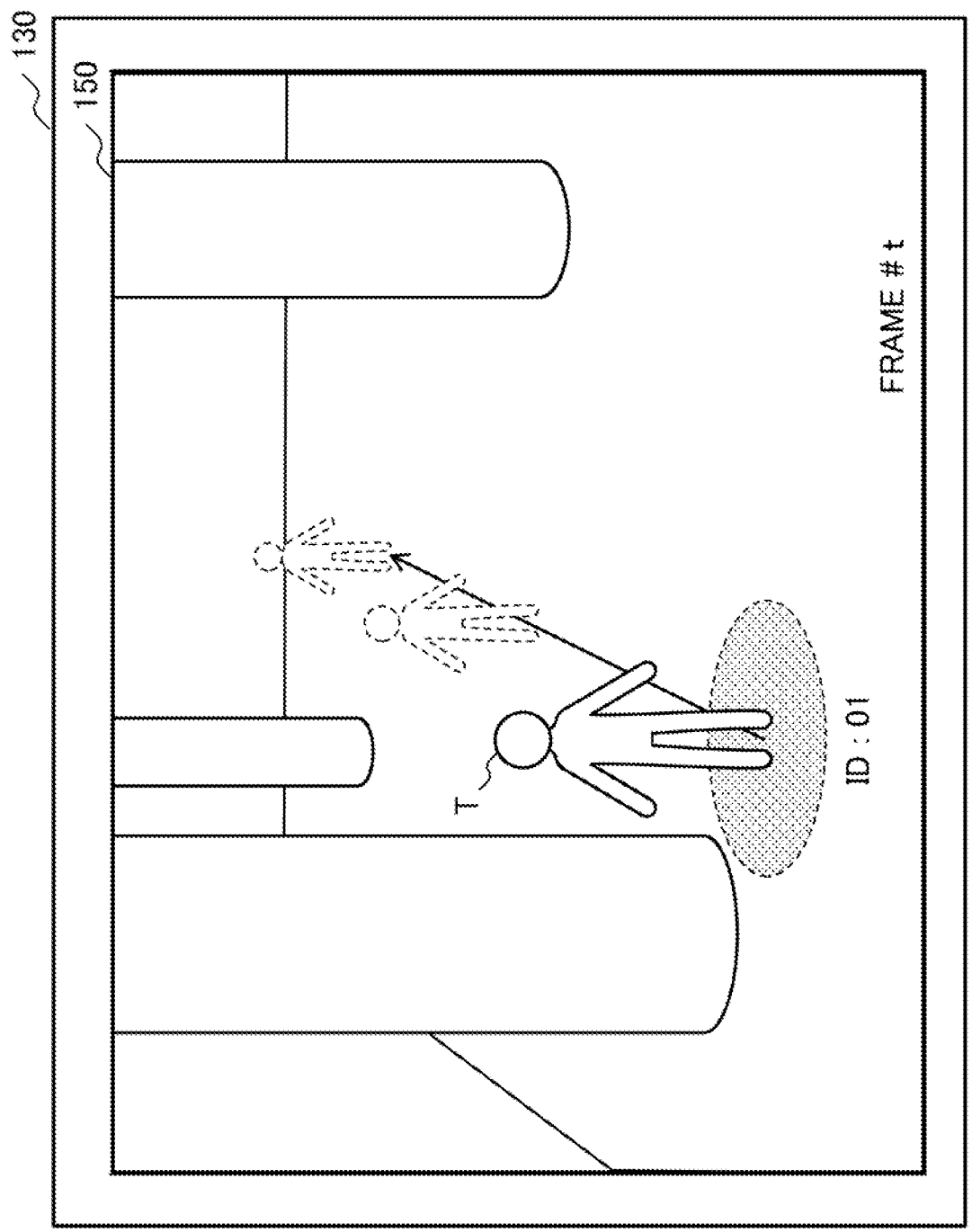
FIG. 4 is a conceptual diagram illustrating an example of display information displayed on a screen of a display device connected to a terminal device included in the tracking system according to the first example embodiment.
Figure 5:
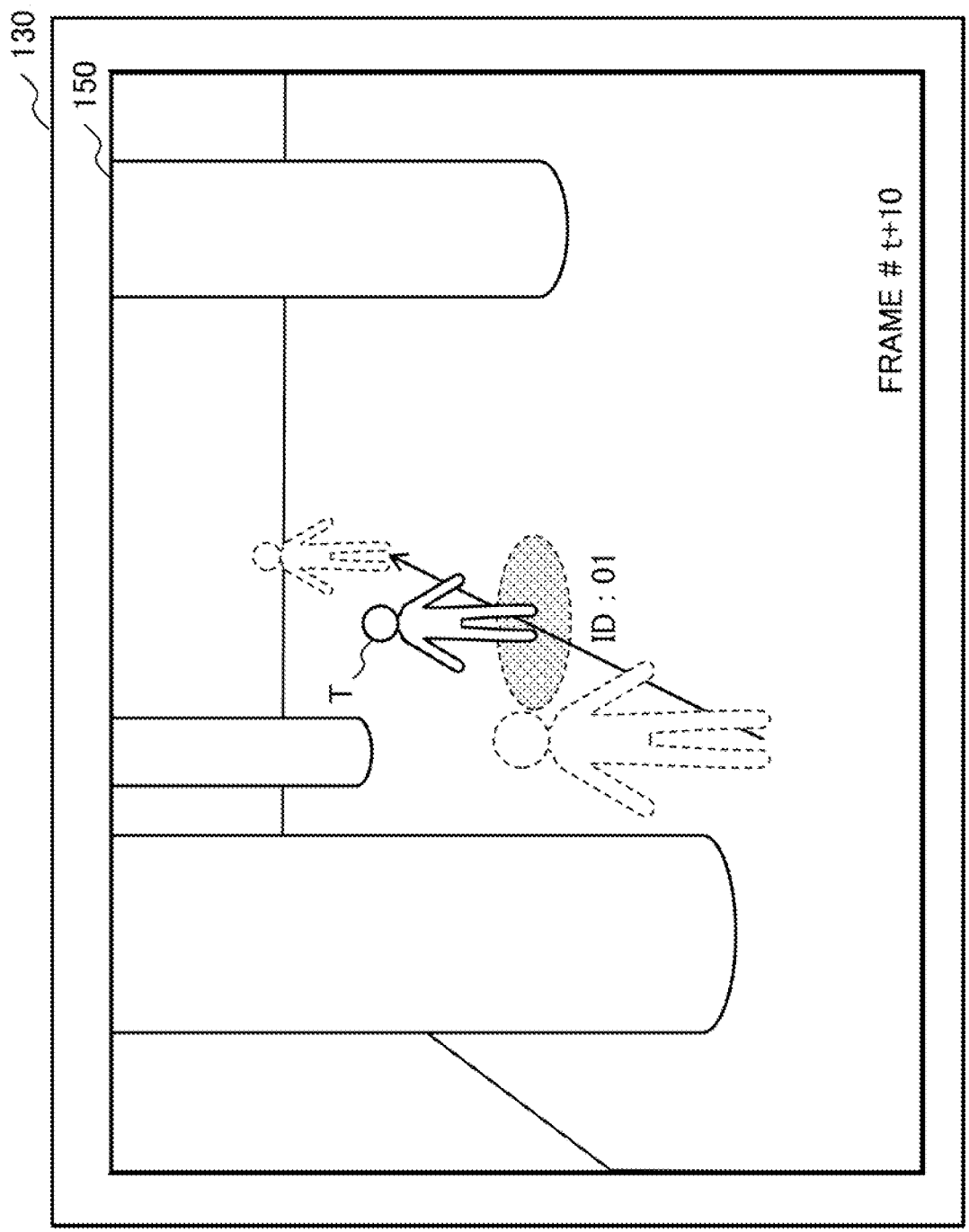
FIG. 5 is a conceptual diagram illustrating an example of display information displayed on a screen of a display device connected to a terminal device included in the tracking system according to the first example embodiment.
Figure 6:
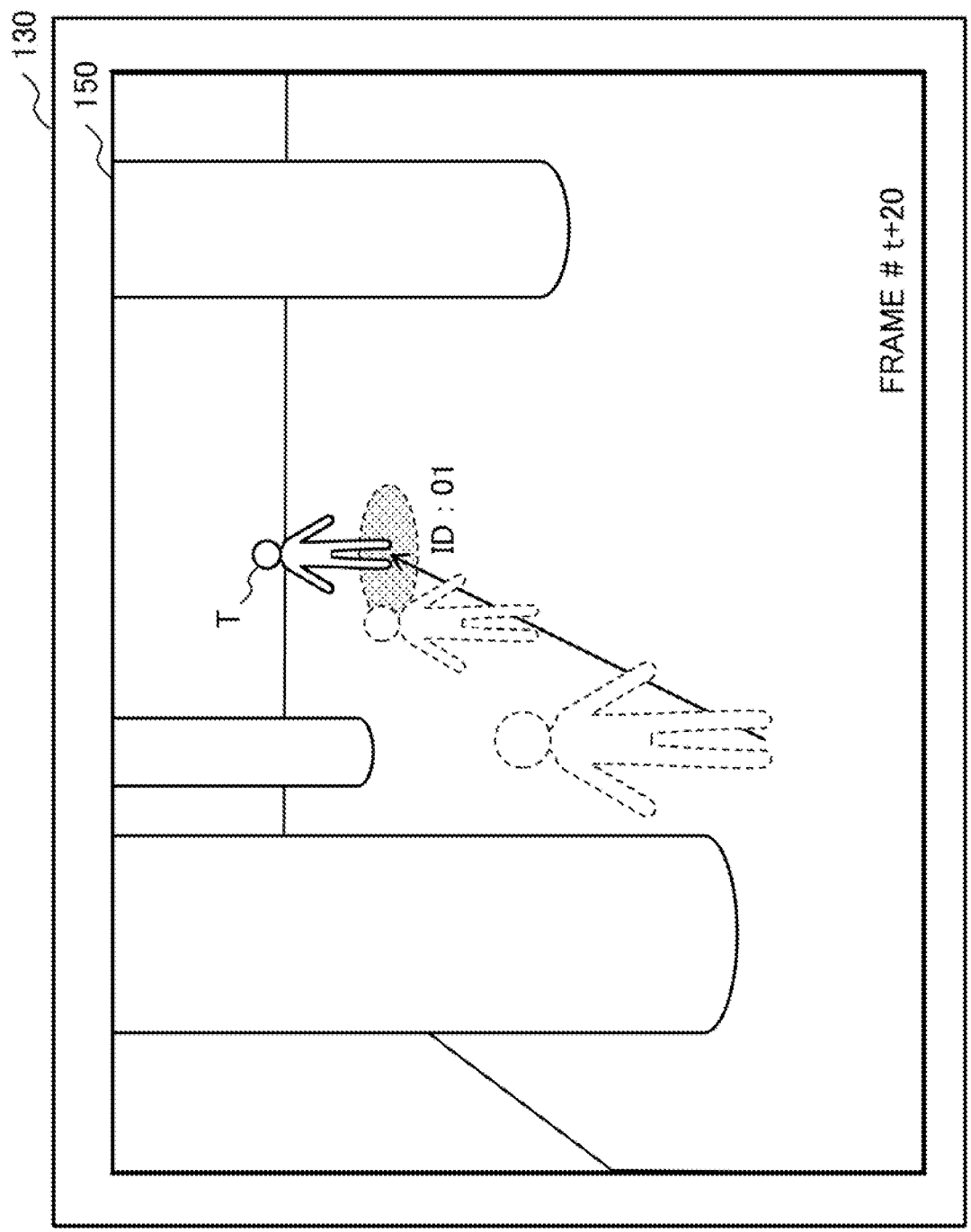
FIG. 6 is a conceptual diagram illustrating an example of display information displayed on a screen of a display device connected to a terminal device included in the tracking system according to the first example embodiment.

FIGS. 4 to 6 are conceptual diagrams illustrating an example of display information displayed in a display region set on a screen of the display device 130. Each of FIGS. 4 to 6 is an example in which an image frame related to each of the frame #s t, t+10, and t+20 is displayed in the image display region 150. Actually, the display information related to the image frames between the verification frames is also displayed in the display region, but in the following, an example in which the image frames related to the verification frames are displayed in the display region will be described.

In the image display region 150, a tracking image in which a collation range or the like is superimposed on an image frame constituting video data generated by the monitoring camera 110 is displayed. FIGS. 4 to 6 are examples in which a tracking target T to which the identification number 01 is assigned moves in a space having several pillars in the direction of the arrow. The identification number may or may not be displayed in association with the position of the tracking target. The human figure indicated by the broken line is for describing the trajectory along with the movement of the tracking target T, and is not displayed in the tracking image. Around the tracking target T in the image frame, a circle centered on the tracking target T and having a spatial threshold value as a diameter is set as a collation range. In the image display region 150, a circle indicating the collation range set around the tracking target T is displayed in a shape related to the viewpoint, the angle of view, and the like of the monitoring camera 110. The collation range can be modified into any shape such as an ellipse, a rectangle, a square, an equilateral triangle, or a regular pentagon, instead of a circle. As illustrated in FIGS. 4 to 6, the size of the collation range is changed in accordance with the size of the tracking target T in the image frame.

Figure 7:
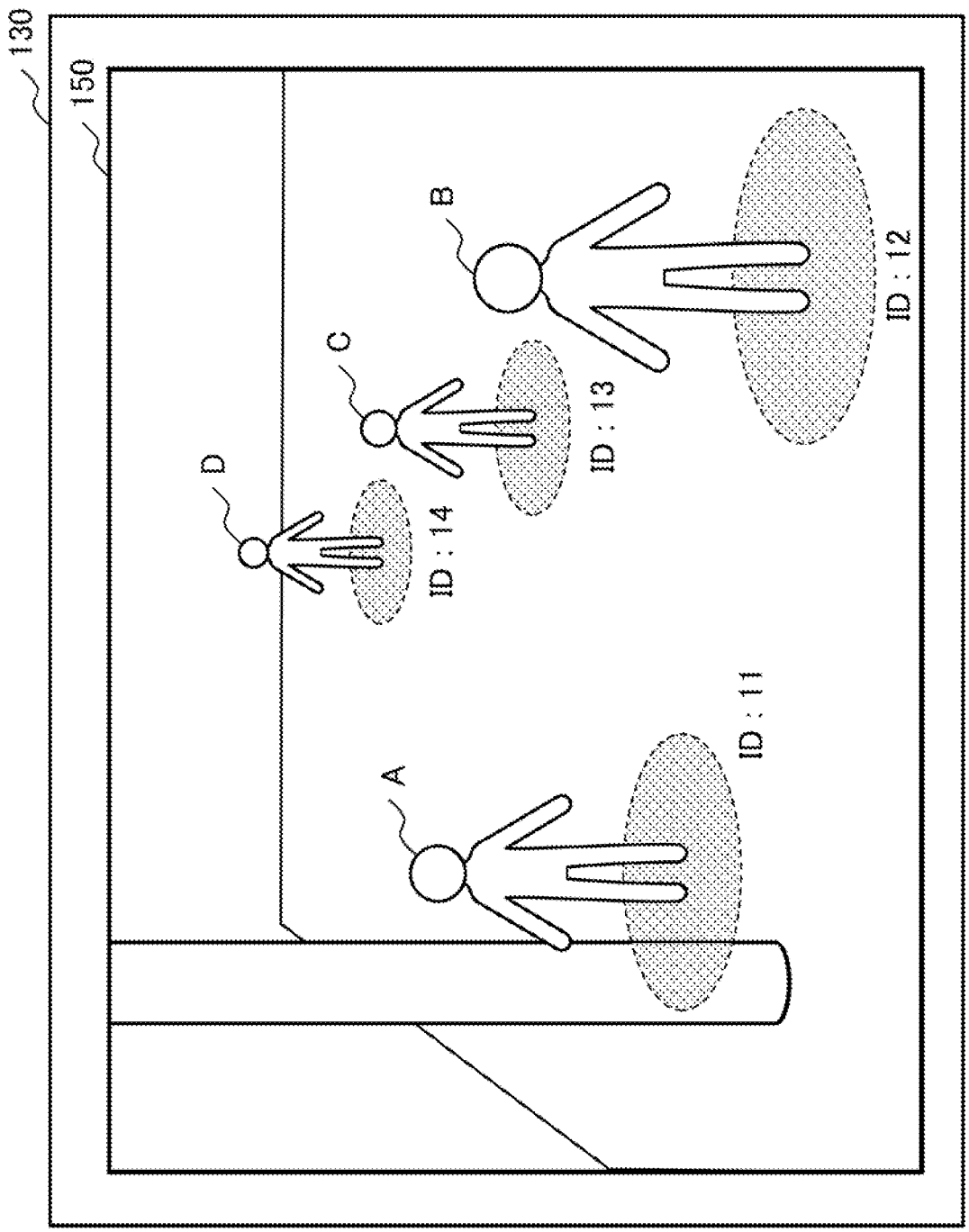
FIG. 7 is a conceptual diagram illustrating an example of display information displayed on a screen of a display device connected to a terminal device included in the tracking system according to the first example embodiment.

FIG. 7 shows an example in which a tracking image of an image frame in which a plurality of tracking targets (tracking targets A, B, C, D) is detected is displayed in the image display region 150. The identification number 11 is assigned to the tracking target A, the identification number 12 is assigned to the tracking target B, the identification number 13 is assigned to the tracking target C, and the identification number 14 is assigned to the tracking target D. In the example of FIG. 7, the collation range of the tracking target A overlaps with the pillar. In such a case, there is a possibility that a different identification number is assigned to the tracking target A before and after the tracking target A passes behind the pillar. For example, when the tracking target A passes behind the pillar, when the collation range of the tracking target A is interrupted behind the pillar, the identification number assigned to the tracking target A is deleted when the collation range is interrupted. Thereafter, when the tracking target A appears from behind the pillar and the collation range is set again to the tracking target A, a different identification number is assigned to the tracking target A although the tracking target A is the same tracking target. In the present example embodiment, the tracking target related to the collation range is continuously tracked by tracking the collation range between the image frames. Therefore, when a different identification number is assigned to the same tracking target between image frames, tracking is interrupted. For example, by collating personal information or the like stored in any database for each image frame using an authentication technology such as face authentication, the tracking target can be continuously tracked even when a different identification number is assigned to the same tracking target. However, in this case, since it is necessary to access the database for each image frame, there may be a case where the tracking target cannot be tracked due to an access delay.

Figure 8:
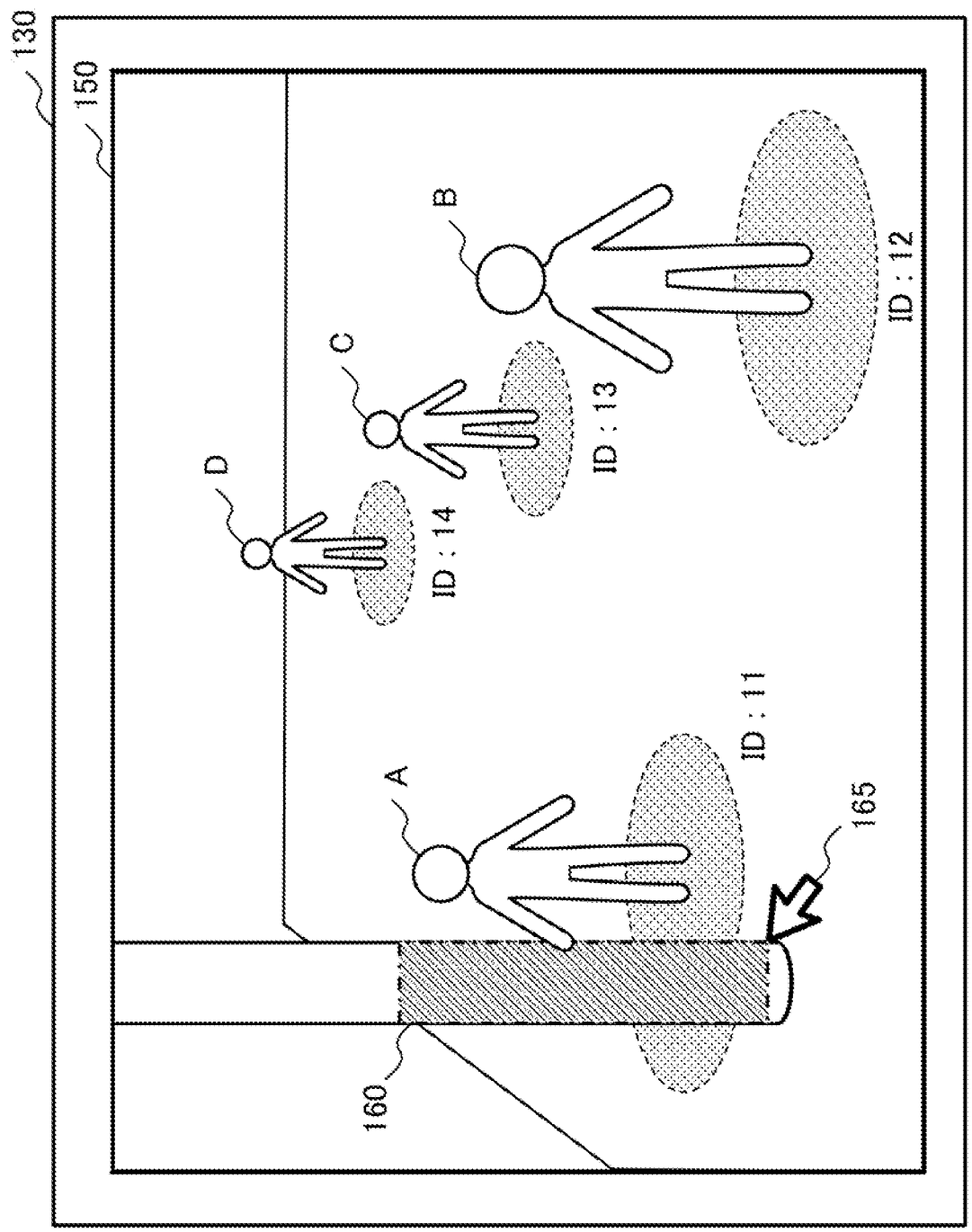
FIG. 8 is a conceptual diagram illustrating an example of display information displayed on a screen of a display device connected to a terminal device included in the tracking system according to the first example embodiment.

FIG. 8 is an example in which an exclusion range 160 is set in the tracking image displayed in the image display region 150 according to the operation by the user. In FIG. 8, the exclusion range 160 is within a rectangular range surrounded by an alternate long and short dash line. In the example of FIG. 8, a left side portion of the collation range associated with the tracking target A is divided into two with the exclusion range 160 interposed therebetween. When the exclusion range 160 and the collation range overlap, a portion, of the collation range, overlapping with the exclusion range 160 is set at a position opposite to a position of collation range with respect to the exclusion range 160. When the exclusion range 160 does not cross the collation range, a portion, of the collation range, overlapping with the exclusion range 160 is set at a position opposite to a position of the collation range with respect to the exclusion range 160. For example, when the collation range is place beyond the exclusion range 160 from the beginning, a portion, of the collation range, obtained by combining a portion overlapping with the exclusion range 160 and a portion placed beyond the exclusion range 160 is set at a position opposite to a position of the collation range with respect to the exclusion range 160. For example, when the collation range is placed beyond the exclusion range 160 from the beginning, the tracking target can be tracked based on a portion placed beyond the exclusion range 160. Therefore, the collation range may be used as it is while ignoring the exclusion range 160.

The outline of the exclusion range 160 may not be a rectangle but any polygons such as a triangle or a pentagon. For example, the outline of the exclusion range 160 may be any closed curve such as a circle or an ellipse. For example, the exclusion range 160 may be a freehand designated region. The exclusion range 160 may be an open region, or may be a closed region.

For example, the exclusion range 160 is set according to the operation of a pointer 165 in the image display region 150. For example, when the user operates the pointer 165 to select a region in accordance with part of the pillar in the image frame, the selected region is set as the exclusion range 160. A method of selecting a region according to the operation of the pointer 165 is not particularly limited.

Figure 9:
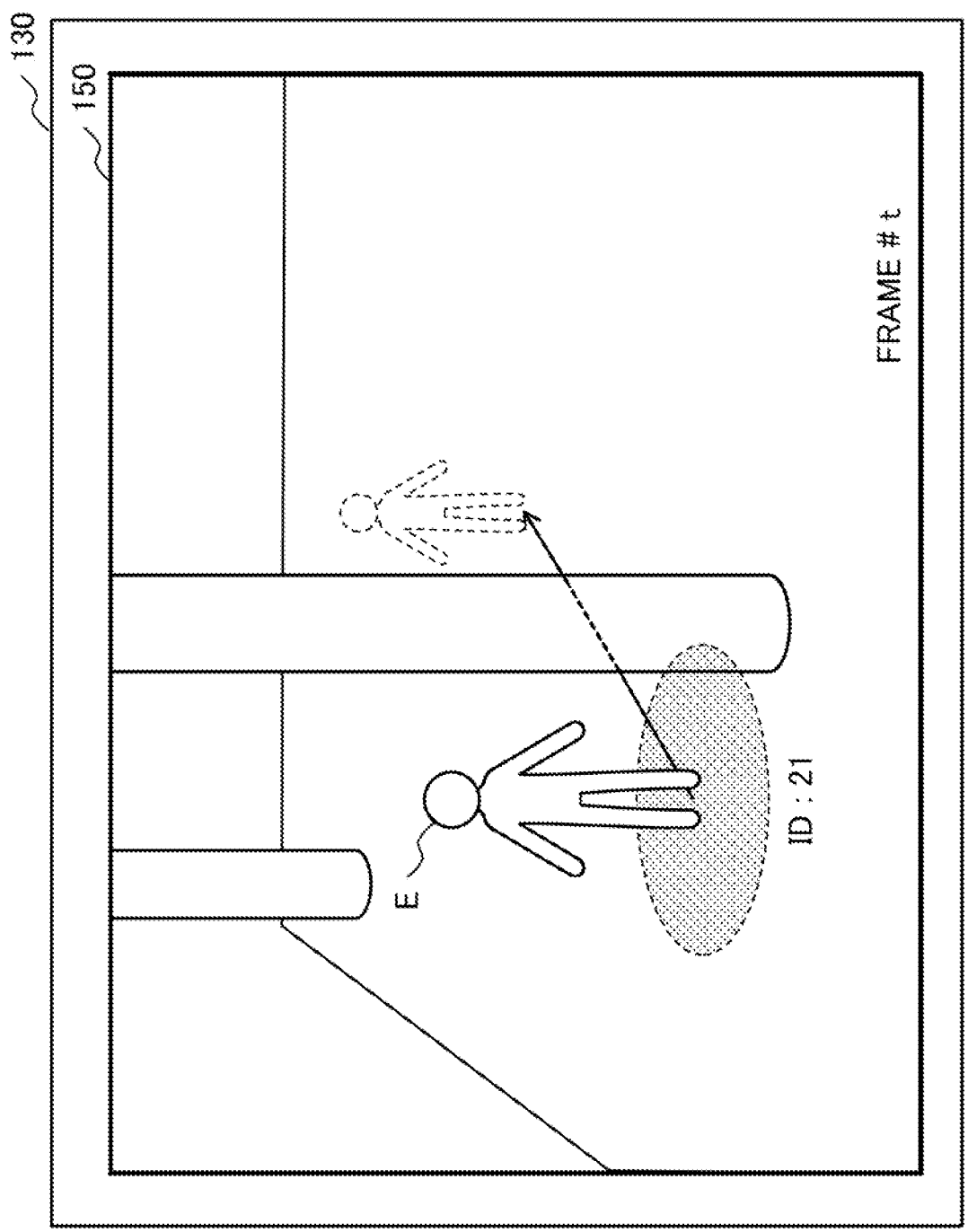
FIG. 9 is a conceptual diagram illustrating an example of display information displayed on a screen of a display device connected to a terminal device included in the tracking system according to the first example embodiment.
Figure 10:
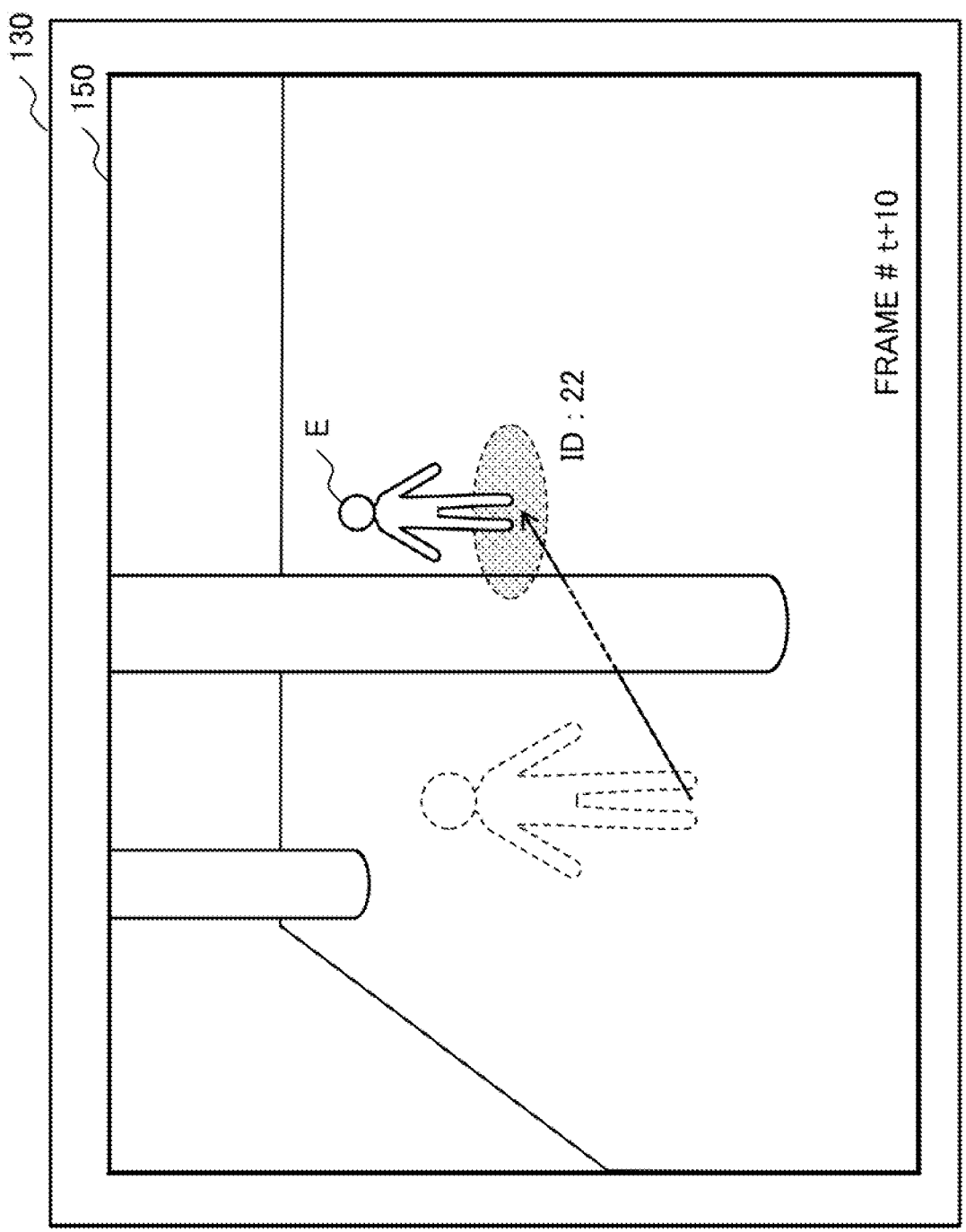
FIG. 10 is a conceptual diagram illustrating an example of display information displayed on a screen of a display device connected to a terminal device included in the tracking system according to the first example embodiment.

FIGS. 9 to 10 are conceptual diagrams for describing an example in which the tracking target E passes behind the pillar. In the image display region 150 of FIG. 9, the tracking image of the image frame with the frame #t is displayed. In the tracking image of the image frame with the frame #t, the identification number 21 is assigned to the tracking target E. In the image display region 150 of FIG. 10, the tracking image of the image frame with the frame #t+10 subsequent to the image frame with the frame #t is displayed. In the image frame with the frame #t+10, the identification number 22 different from that of the image frame with the frame #t is assigned to the tracking target E. As described above, in a different image frame, one reason why a different identification number is assigned to the same tracking target is that the spatial threshold value that is a spatial threshold value, is too small. When the spatial threshold value is too small, the tracking target cannot be tracked based on the collation range between consecutive image frames, and a different identification number is likely to be assigned to the same tracking target.

Figure 11:
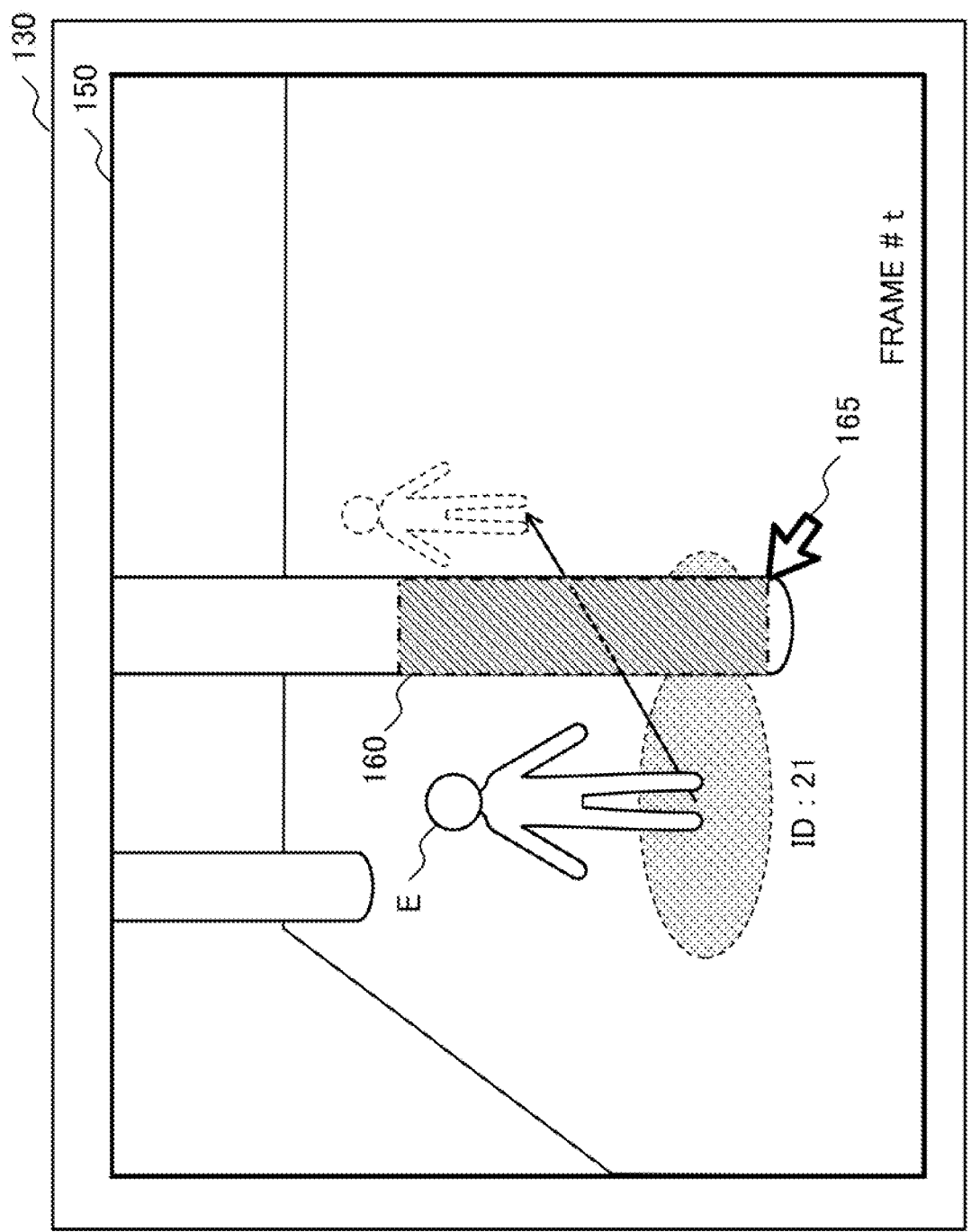
FIG. 11 is a conceptual diagram illustrating an example of display information displayed on a screen of a display device connected to a terminal device included in the tracking system according to the first example embodiment.
Figure 12:
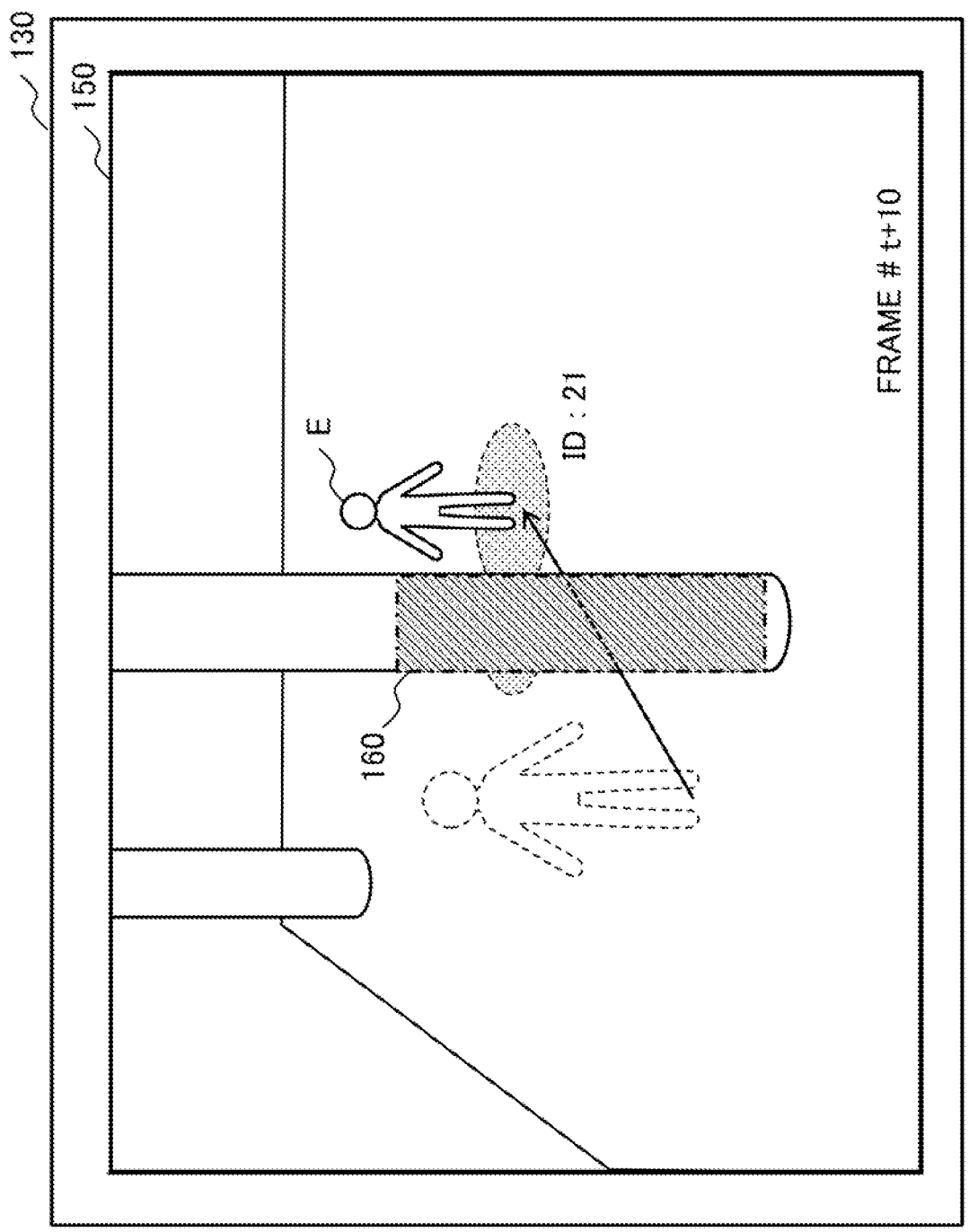
FIG. 12 is a conceptual diagram illustrating an example of display 20 information displayed on a screen of a display device connected to a terminal device included in the tracking system according to the first example embodiment.

FIGS. 11 to 12 are conceptual diagrams for describing an example in which the exclusion range 160 is set in the tracking image displayed in the image display region 150 according to the setting of the user in the examples of FIGS. 9 to 10.

In the image display region 150 of FIG. 11, the tracking image of the image frame with the frame #t is displayed. In the tracking image of the image frame with the frame #t, the identification number 21 is assigned to the tracking target E. In the image display region 150 of FIG. 12, the tracking image of the image frame with the frame #t+10 subsequent to the image frame with the frame #t is displayed. In the image frame with the frame #t+10, the identification number 21 same as that of the image frame with the frame #t is assigned to the tracking target E. In the example of FIG. 11, since the collation range is set by ignoring the pillar, the tracking target can be easily tracked based on the collation range before and after the tracking target E passes the pillar.

As described above, in a case where there is an obstacle or the like in a series of image frames, the exclusion range may be set in association with the obstacle or the like. When the exclusion range is set in association with the obstacle or the like, the collation range is set by ignoring the obstacle or the like, so that the tracking target can be easily tracked based on the collation range between consecutive image frames. As a result, since the flow lines of the tracking target are easily connected, a different identification number is hardly assigned to the same tracking target in a series of image frames. When the spatial threshold value is excessively large, the collation ranges of different tracking targets overlap with each other between consecutive image frames, and the identification numbers are easily exchanged. Therefore, in order to reduce assignment of the different identification numbers to the same tracking target in a series of image frames, it is effective to be able to set the optimum collation range according to the setting of the exclusion range by the user as in the present example embodiment.

Figure 13:
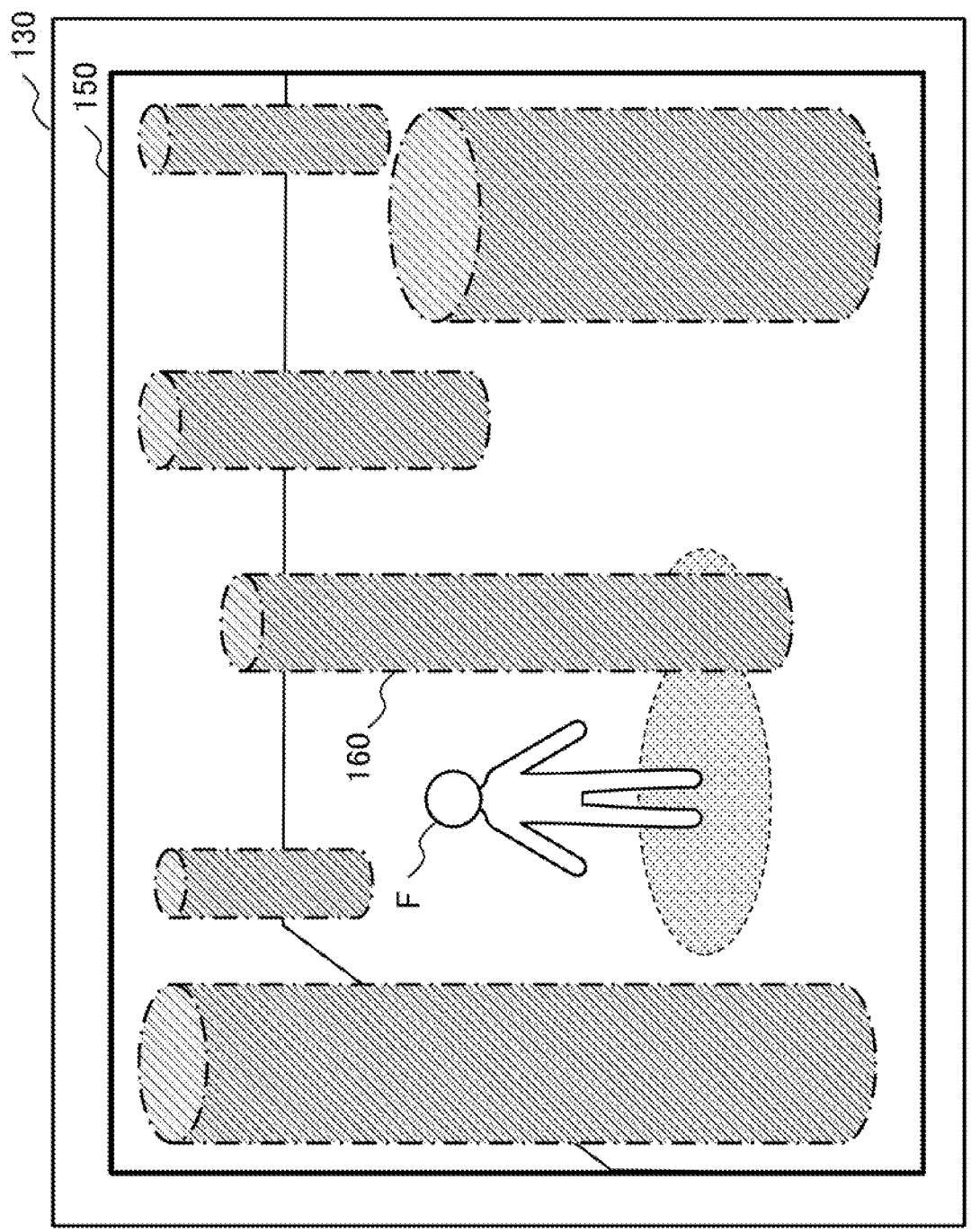
FIG. 13 is a conceptual diagram illustrating an example of display information displayed on a screen of a display device connected to a terminal device included in the tracking system according to the first example embodiment.

FIG. 13 is a conceptual diagram for describing an example in which the exclusion range 160 associated with a plurality of obstacles are set in advance in an image frame included in video data obtained by imaging a space where the plurality of obstacles exists. In the example of FIG. 13, the exclusion range 160 is set for all the obstacles included in the tracking image displayed in the image display region 150. The collation range associated with the tracking target F is divided into two with the obstacle interposed therebetween. The exclusion range 160 may be set in advance in association with the position of the obstacle. The exclusion range 160 may be set by the user or may be automatically set by the tracking unit 13. For example, the tracking unit 13 may be configured to extract the feature amount of the physical object (obstacle or the like) set as the exclusion range from the image frame, and automatically set the exclusion range 160 based on the extracted feature amount. For example, the tracking unit 13 learns the feature amount of the obstacle extracted from the plurality of image frames using a technique such as deep learning, and generates a model for estimating the position of the obstacle from any image frames. For example, the tracking unit 13 sets the exclusion range in association with the position of the obstacle output by inputting the verification target frame into the model. The method by which the tracking unit 13 detects an obstacle from an image frame is not limited to the method described herein. For example, the tracking unit 13 may detect the obstacle based on the color, shading, luminance, positional relationship with the tracking target, and the like of the obstacle in the image frame.

Operation

Next, the operation of the tracking device 10 according to the present example embodiment will be described with reference to the drawings. Here, a process of generating display information for each verification frame (display information generation process) and a process of setting a collation range according to a user's operation (collation range setting process) will be described.

[Display Information Generation Process]

Figure 14:
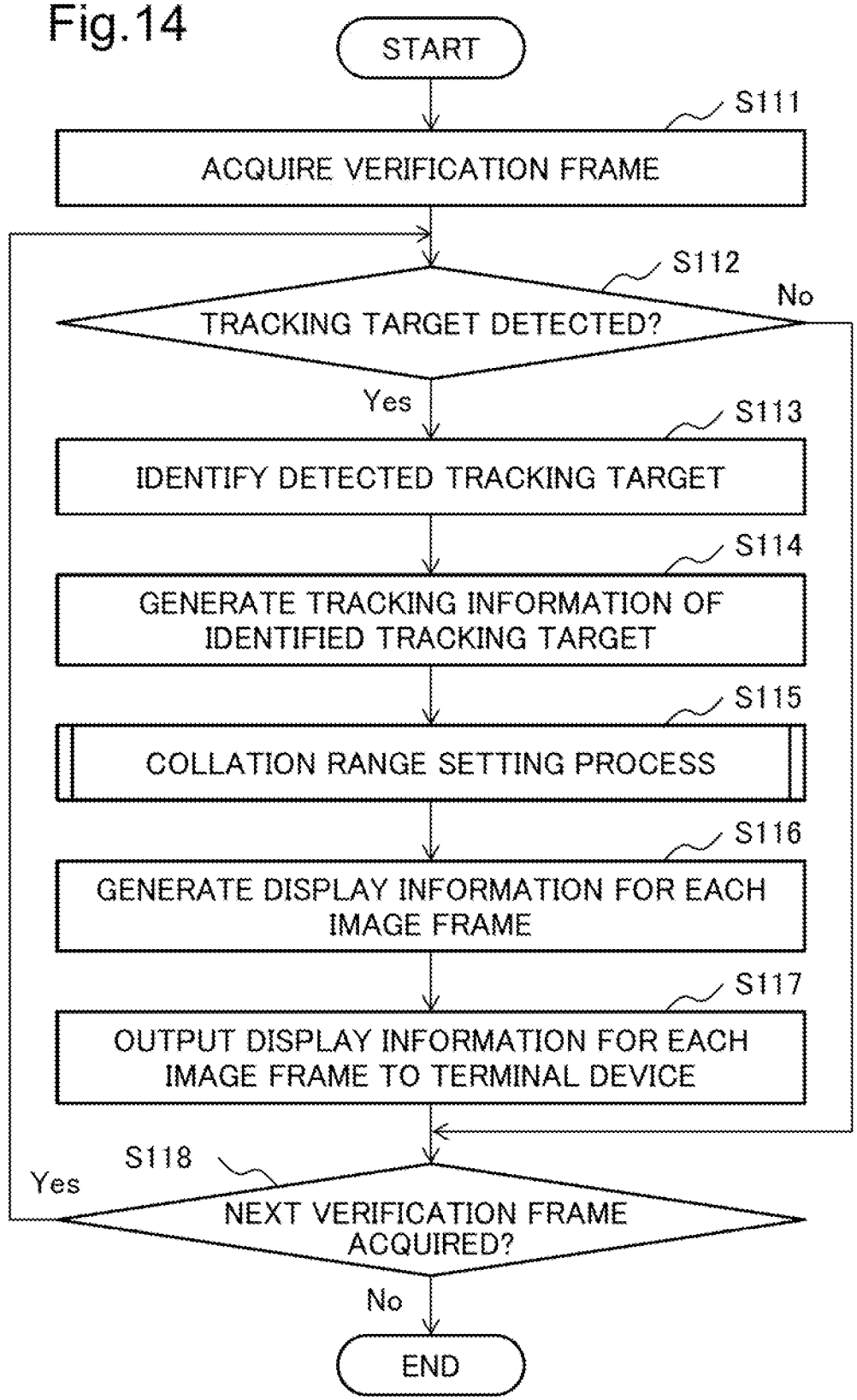
FIG. 14 is a flowchart illustrating an example of an operation of the tracking device included in the tracking system according to the first example embodiment.

FIG. 14 is a flowchart for explaining a display information generation process by the tracking device 10. In the process along the flowchart of FIG. 14, the tracking device 10 performs the main operation.

In FIG. 14, first, the tracking device 10 acquires a verification frame (step S111).

Next, the tracking device 10 verifies the presence or absence of the tracking target in the acquired verification frame (step S112). When the tracking target is detected in the verification frame (Yes in step S112), the tracking device 10 identifies the detected tracking target (step S113). On the other hand, when the tracking target has not been detected in the verification frame (No in step S112), the process proceeds to step S118.

After step S113, the tracking device 10 generates tracking information of the identified tracking target (step S114).

Next, the tracking device 10 executes a collation range setting process of setting a collation range in association with the tracking target based on the tracking information for each tracking target (step S115). Details of the collation range setting process will be described with reference to the flowchart of FIG. 15.

Next, the tracking device 10 generates display information for each image frame (step S116).

Next, the tracking device 10 outputs the display information for each image frame to the terminal device 120 (step S117).

Here, when the next verification frame is acquired (Yes in step S118), the process returns to step S112. On the other hand, when the next verification frame has not been acquired (No in step S118), the process according to the flowchart of FIG. 14 ends. When the process according to the flowchart of FIG. 14 ends, the tracking device 10 enters a standby state until the next verification frame is acquired.

[Collation Range Setting Process]

Figure 15:
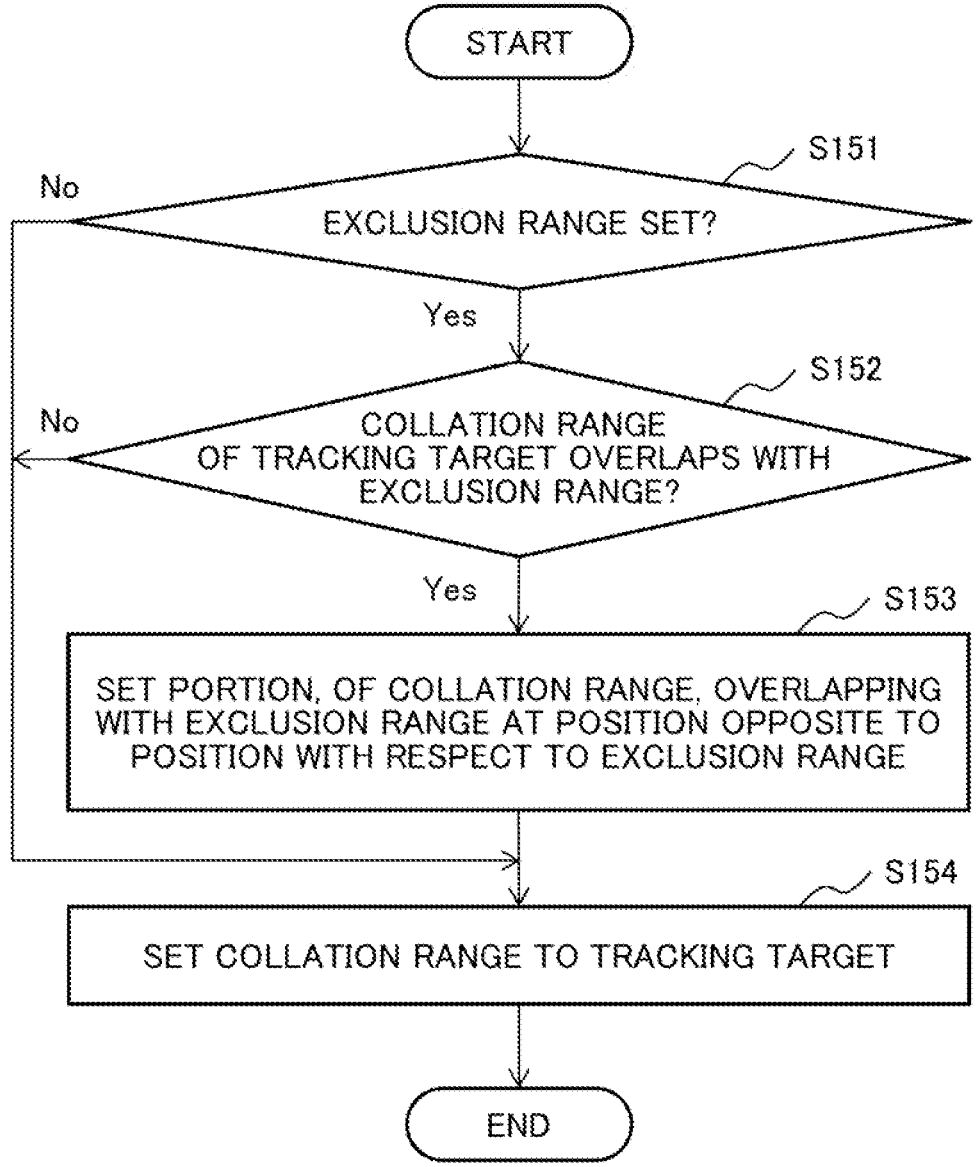
FIG. 15 is a flowchart illustrating an example of a collation range setting process by the tracking device included in the tracking system according to the first example embodiment.

FIG. 15 is a flowchart for explaining the collation range setting process by the tracking device 10. The collation range setting process is a collation range setting process of step S115 of the flowchart of FIG. 14. In the process along the flowchart of FIG. 15, the tracking device 10 performs the main operation.

In FIG. 15, first, the tracking device 10 checks whether an exclusion range is set (step S151). When an exclusion range is set (Yes in step S151), the tracking device 10 verifies whether there is a collation range, of the collation range of the tracking target, overlapping with the exclusion range (step S152). On the other hand, when the exclusion range is not set (No in step S151), the process proceeds to step S154.

In step S152, when there is a portion, of the collation range of the tracking target, overlapping with the exclusion range (Yes in step S152), the tracking device 10 sets a portion, of the collation range, overlapping with the exclusion range at a position opposite to a position of the collation range with respect to the exclusion range (step S153). On the other hand, when there is no portion, of the collation range of the tracking target, overlapping with the exclusion range (No in step S152), the process proceeds to step S154.

Then, the tracking device 10 sets the collation range in association with the tracking target (step S154). After step S154, the process proceeds to step S116 in the flowchart of FIG. 14.

As described above, the tracking system of the present example embodiment includes the tracking device, at least one monitoring camera, and the terminal device. The monitoring camera images a range to be monitored and generates video data. The terminal device is connected to a display device having a screen for displaying display information generated by the tracking device.

The tracking device includes a video acquisition unit, a video storage unit, a tracking unit, a display information generation unit, a display information output unit, and a designation range acquisition unit. The video acquisition unit acquires video data. The video storage unit stores the video data acquired by the video acquisition unit. The designation range acquisition unit acquires the designation range designated for each of the plurality of image frames constituting the video data. The tracking unit extracts an image frame to be verified from the video data, detects a tracking target for each extracted image frame, sets a collation range for the detected tracking target, and adjusts the collation range based on a designation range set for each image frame. The display information generation unit generates, for each image frame, a tracking image in which the tracking target is associated with the collation range.

In an aspect of the present example embodiment, the designation range acquisition unit acquires, as the designation range, an exclusion range designated on a screen displaying an image frame. The tracking unit perform setting for the tracking target in such a way as to move the collation range overlapping with the exclusion range to a position opposite to a position of the collation range with respect to the exclusion range.

In an aspect of the present example embodiment, the tracking unit designates the exclusion range in the image frame based on the feature amount extracted from the image frame, and performs setting for the tracking target in such a way as to move the collation range overlapping with the exclusion range to a position opposite to a position of the collation range with respect to the exclusion range.

In an aspect of the present example embodiment, the terminal device sets an image display region in which at least one tracking image is displayed on a screen of a display device. The terminal device receives designation of a designation range in the tracking image displayed in the image display region to output the designation range designated in the tracking image to the tracking device. The terminal device acquires the tracking image updated based on the setting of the designation range from the tracking device, and displays the updated tracking image on the screen of the display device. For example, the terminal device displays at least one tracking image in the image display region, receives designation of an exclusion range in the tracking image, and outputs, as the designation range, the exclusion range designated in the tracking image to the tracking device.

According to the present example embodiment, since the collation range overlapping with the obstacle or the like in the video captured by the monitoring camera is adjusted in accordance with the scene in the real space, it is possible to accurately track the tracking target in accordance with the scene in the real space. For example, according to the present example embodiment, when the collation range overlaps with the obstacle or the like in the video captured by the monitoring camera, the exclusion range in the video can be intuitively designated without complicated calculation.

Second Example Embodiment

Next, a tracking device according to the second example embodiment will be described with reference to the drawings. The tracking device of the present example embodiment is different from that of the first example embodiment in that image frames constituting video data imaged by a plurality of monitoring cameras are associated. In the present example embodiment, a common collation range is set for the tracking target located in the proximity range with respect to at least two image frames including ranges in which the distance therebetween is close in the real space among different image frames imaged by different monitoring cameras. The ranges in which the distance is close in the real space are a designation range (also referred to as a proximity range) designated by the user.

(Configuration)

Figure 16:
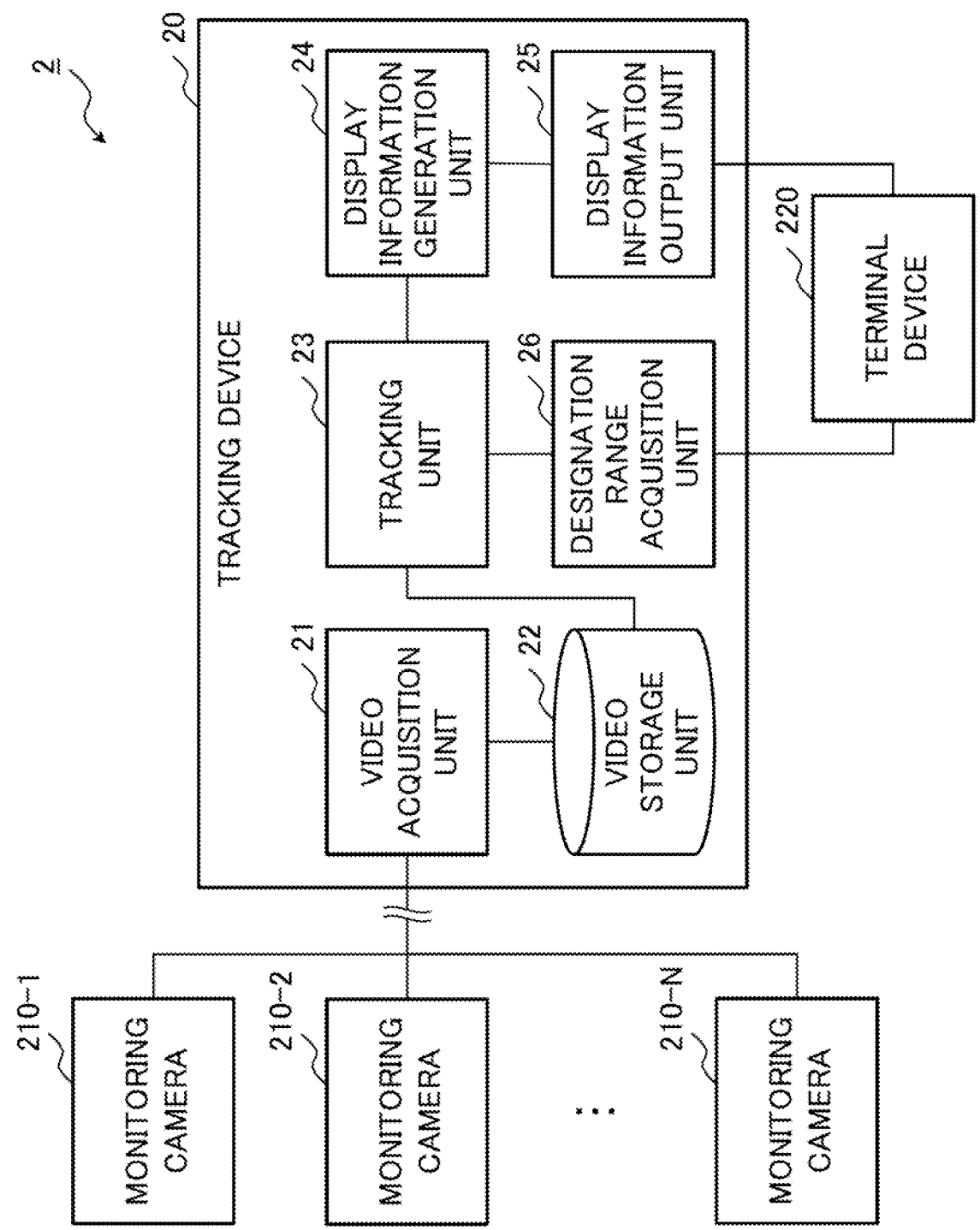
FIG. 16 is a block diagram illustrating an example of a configuration of a tracking system according to a second example embodiment.

FIG. 16 is a block diagram illustrating an example of a configuration of a tracking system 2 according to the present example embodiment. The tracking system 2 includes a tracking device 20, a plurality of monitoring cameras 210-1 to N, and a terminal device 220 (N is a natural number of 2 or more). When each of the plurality of monitoring cameras 210-1 to N is not distinguished, it is referred to as a monitoring camera 210. Although only one terminal device 220 is illustrated in FIG. 16, a plurality of terminal devices 220 may be provided.

Each of the plurality of monitoring cameras 210-1 to N is disposed at a position where the range to be monitored can be imaged. Each of the plurality of monitoring cameras 210-1 to N has the configuration same as that of the monitoring camera 110 of the first example embodiment. At least two of the plurality of monitoring cameras 210-1 to N image a range to be monitored including a proximity range in the real space.

Each of the plurality of monitoring cameras 210-1 to N images the range to be monitored at set imaging intervals, and generates video data. The imaging timing of each of the plurality of monitoring cameras 210-1 to N is set to any timing. However, when verifying the image frames imaged by at least two monitoring cameras 210 that image the range to be monitored including the proximity range in the real space, the image frames imaged at the same timing are used. Each of the plurality of monitoring cameras 210-1 to N outputs the generated video data to the tracking device 20. The video data includes a plurality of pieces of image data (also referred to as image frames) imaged at set imaging intervals. The timing at which each of the plurality of monitoring cameras 210-1 to N outputs data to the tracking device 20 is not particularly limited. For example, each of the plurality of monitoring cameras 210-1 to N outputs video data constituted by a plurality of image frames to the tracking device 20. For example, each of the plurality of monitoring cameras 210-1 to N may output the plurality of image frames to the tracking device 20 in chronological imaging order of.

The tracking device 20 includes a video acquisition unit 21, a video storage unit 22, a tracking unit 23, a display information generation unit 24, a display information output unit 25, and a designation range acquisition unit 26. For example, the tracking device 20 is disposed on a server or a cloud. For example, the tracking device 20 may be provided as an application installed in the terminal device 220. The functions of the video acquisition unit 21, the video storage unit 22, the display information generation unit 24, and the display information output unit 25 are similar to the related configurations of the tracking device 10 according to the first example embodiment, and thus detailed description thereof will be omitted. Since the main function of the tracking unit 23 is similar to that of the tracking unit 13 of the tracking device 10 of the first example embodiment, differences from the tracking unit 13 will be focused in the following description.

The tracking unit 23 acquires, from the video storage unit 22, a verification frame extracted based on the time threshold value with respect to video data imaged by at least two monitoring cameras 210. The tracking unit 23 detects the tracking target from the acquired verification frame. The tracking unit 23 assigns an identification number to the tracking target detected from the verification frame. The tracking unit 23 generates tracking information in which an identification number of the tracking target, a position, a size, a speed, and the like of the tracking target in the image frame are associated with the tracking target detected from the verification frame. The tracking unit 23 sets the collation range based on the spatial threshold value in association with the position of the tracking target according to the size of the tracking target in the image frame.

In a case where the proximity range is set in the image frame, the tracking unit 23 calculates a collation range shared between different image frames with respect to the inside of the proximity range based on the coordinate system of the real space. For example, the tracking unit 23 converts the relative coordinates inside the proximity range into the world coordinate system in the real world using a table that associates the relative coordinate system for each image frame with the world coordinate system in the real world. For example, regarding the inside of the proximity range of different image frames, the tracking unit 23 calculates the collation range according to the position based on the world coordinate system in the real world. For example, the tracking unit 23 converts the collation range into a relative coordinate system of each image frame, and sets a collation range shared by different image frames.

In a case where the collation range associated with the tracking target is included in the proximity range, the tracking unit 23 converts entire collation range into the world coordinate system, and sets the collation range based on the distance in the real world. When part of the collation range associated with the tracking target overlaps with the proximity range, the tracking unit 23 converts the collation range overlapping with the proximity range into the world coordinate system, and sets the collation range based on the distance in the real world. In a case where part of the collation range associated with the tracking target overlaps with the proximity range, the tracking unit 23 may convert the entire collation range into the world coordinate system and set the collation range based on the distance in the real world.

The tracking unit 23 adds the set collation range to the tracking information. The tracking unit 23 outputs the tracking information for each image frame constituting the video data to the display information generation unit 24.

The designation range acquisition unit 26 acquires the designation range (proximity range) designated by the user from the terminal device 220. The designation range acquisition unit 26 outputs the acquired proximity range to the tracking unit 23.

Figure 17:
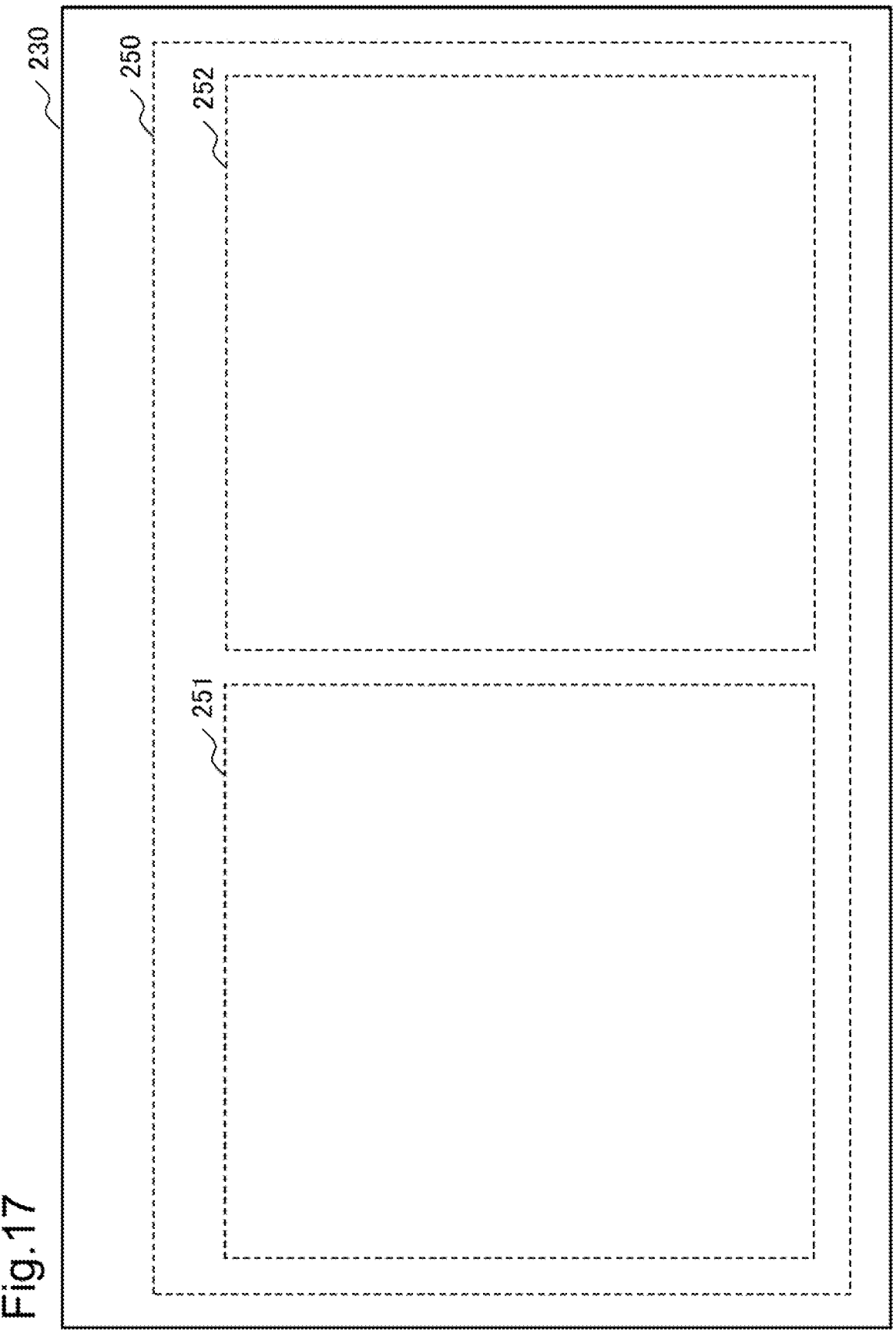
FIG. 17 is a conceptual diagram illustrating an example of a display region set on a screen of a display device connected to a terminal device included in the tracking system according to the second example embodiment.

FIG. 17 is a conceptual diagram for describing display information displayed on a screen of a display device 230 connected to the terminal device 220. An image display region 250 is set on the screen of the display device 230. The image display region 250 includes a first display region 251 and a second display region 252. In the first display region 251, a tracking image based on an image frame constituting moving image data imaged by any of the plurality of monitoring cameras 210-1 to N is displayed. In the second display region 252, a tracking image of an image frame having a common portion in the real space with an image frame that is a source of the tracking image displayed in the first display region 251 is displayed. In the first display region 251 and the second display region 252, the tracking image for each image frame is displayed. A display region other than the image display region 250 may be set on the screen of the display device 230. The display position of the image display region 250 on the screen can be changed to any position.

Figure 18:
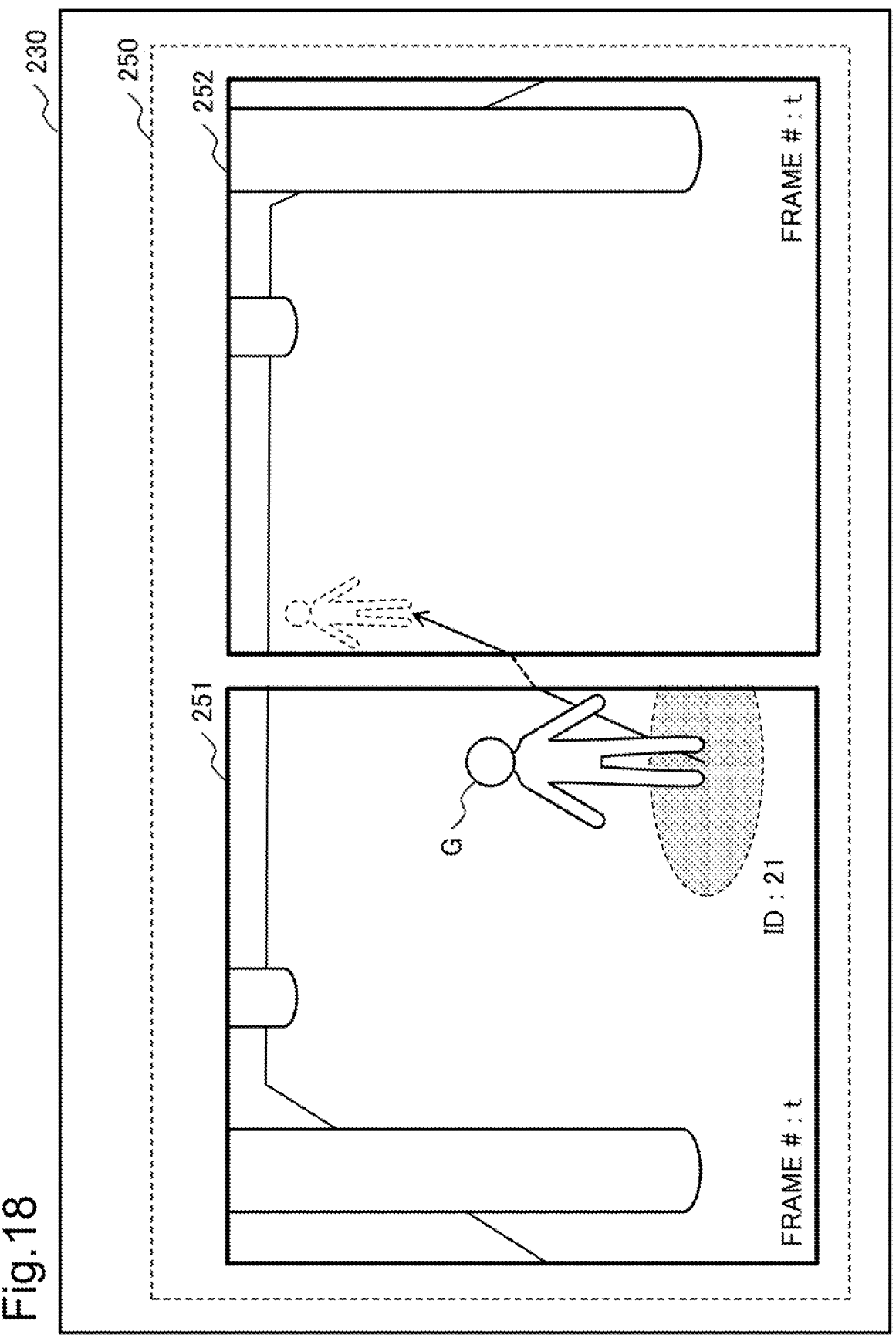
FIG. 18 is a conceptual diagram illustrating an example of display information displayed on a screen of a display device connected to a terminal device included in a tracking system according to the second example embodiment.
Figure 19:
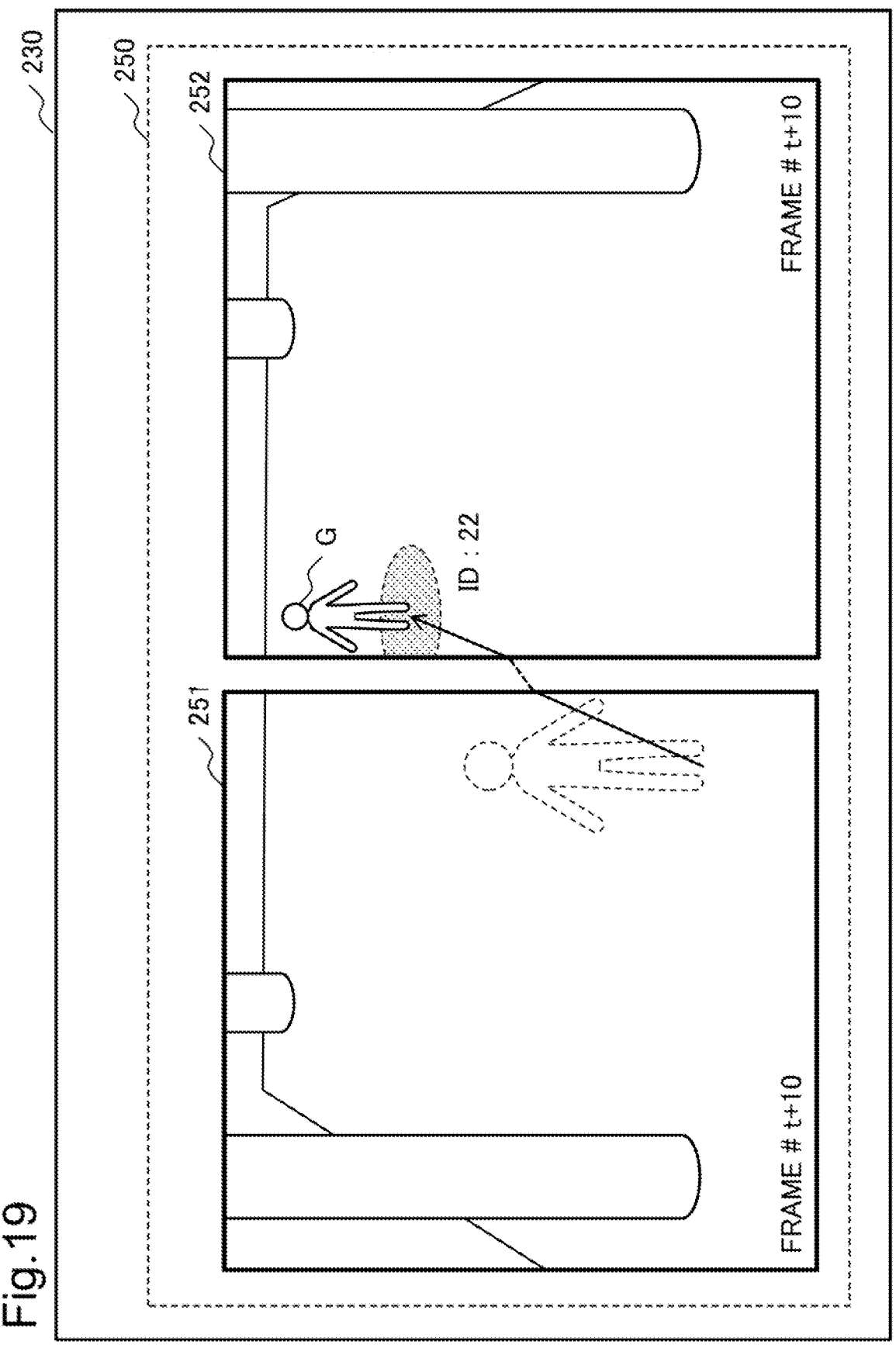
FIG. 19 is a conceptual diagram illustrating an example of display information displayed on a screen of a display device connected to a terminal device included in the tracking system according to the second example embodiment.

FIGS. 18 and 19 are display examples of display information in a case where the proximity range in the real space is not set to the image frame. In FIGS. 18 and 19, the tracking image related to the image frame constituting each of the two pieces of video data having the proximity range in the real space is displayed in each of the first display region 251 and the second display region 252. It is assumed that these two pieces of video data are imaged by different monitoring cameras 210. FIG. 18 illustrates an example in which the tracking image with the frame #t is displayed in the image display region 250. FIG. 19 illustrates an example in which the tracking image with the frame #t+10 subsequent to the frame #t is displayed in the image display region 250. A right side portion of the tracking image displayed in the first display region 251 and a left side portion of the tracking image displayed in the second display region 252 are the proximity range in the real space. It is assumed that a tracking target G moves from a position of the tracking target G in the tracking image displayed in the first display region 251 illustrated in FIG. 18 toward a position of the tracking target G in the tracking image displayed in the second display region 252 illustrated in FIG. 19.

As illustrated in FIG. 18, in the frame #t, the tracking target G is included in the tracking image displayed in the first display region 251. The tracking target G has a collation range only in the tracking image displayed in the first display region 251. An identification number 21 is assigned to the tracking target G. As illustrated in FIG. 19, in the frame #t+10, the tracking target G is included in the tracking image displayed in the second display region 252. The tracking target G has a collation range only in the tracking image displayed in the second display region 252. An identification number 22 is assigned to the tracking target G. As described above, even when there is a proximity portion in the real space imaged by different monitoring cameras 210, different identification numbers are assigned to the same tracking target in different image frames unless a proximity range is set between image frames. For example, when the identification number is not shared between different monitoring cameras 210, different identification numbers are assigned to the same tracking target for each monitoring camera 210. When different identification numbers are assigned to the same tracking target, it is difficult to keep tracking the tracking target between the monitoring cameras 210. For example, by collating personal information or the like stored in any database for each image frame using an authentication technology such as face authentication, the tracking target can be continuously tracked even when a different identification number is assigned to the same tracking target. However, in this case, since it is necessary to access the database for each image frame, there may be a case where the tracking target cannot be tracked due to an access delay.

Figure 20:
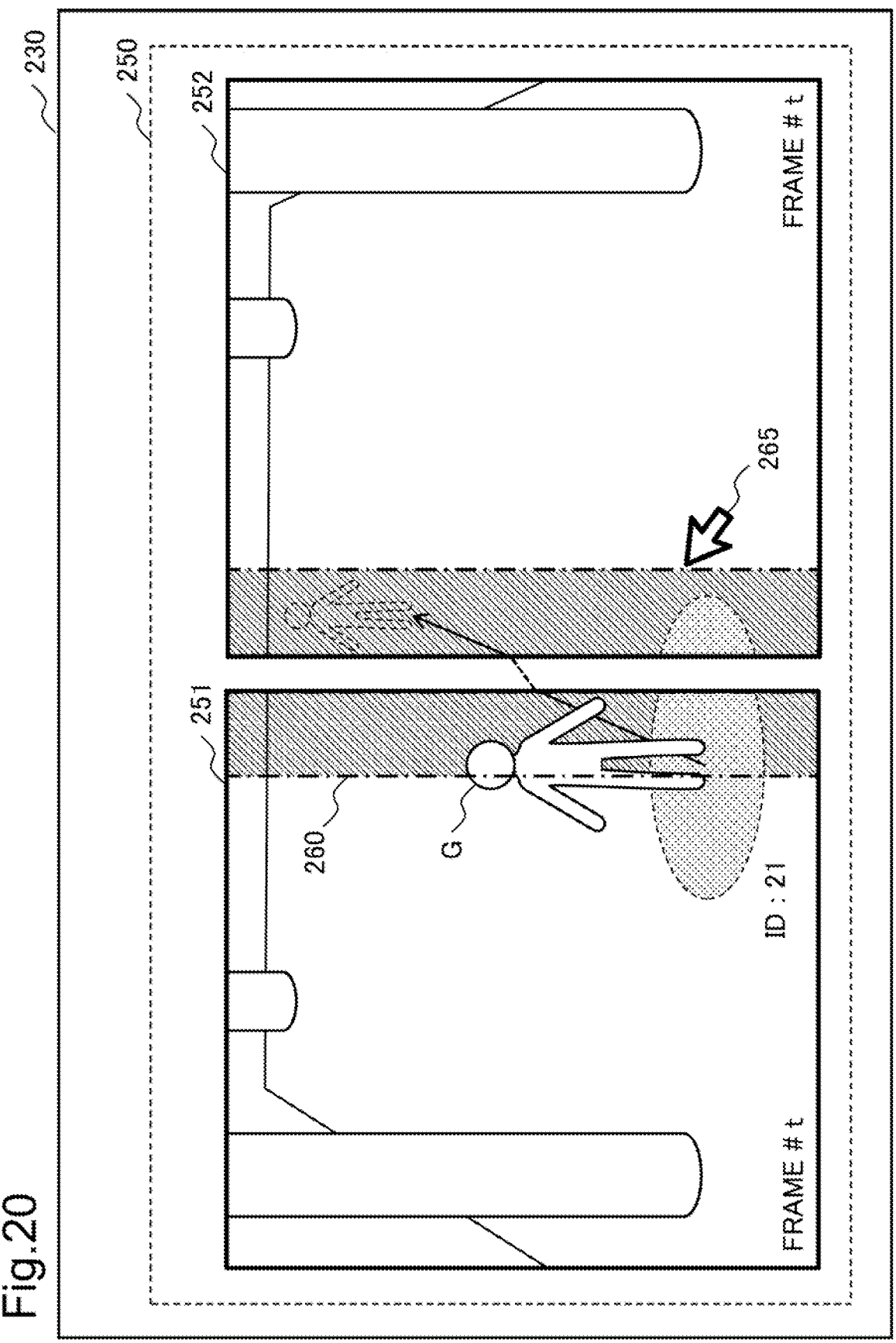
FIG. 20 is a conceptual diagram illustrating an example of display information displayed on a screen of a display device connected to a terminal device included in the tracking system according to the second example embodiment.
Figure 21:
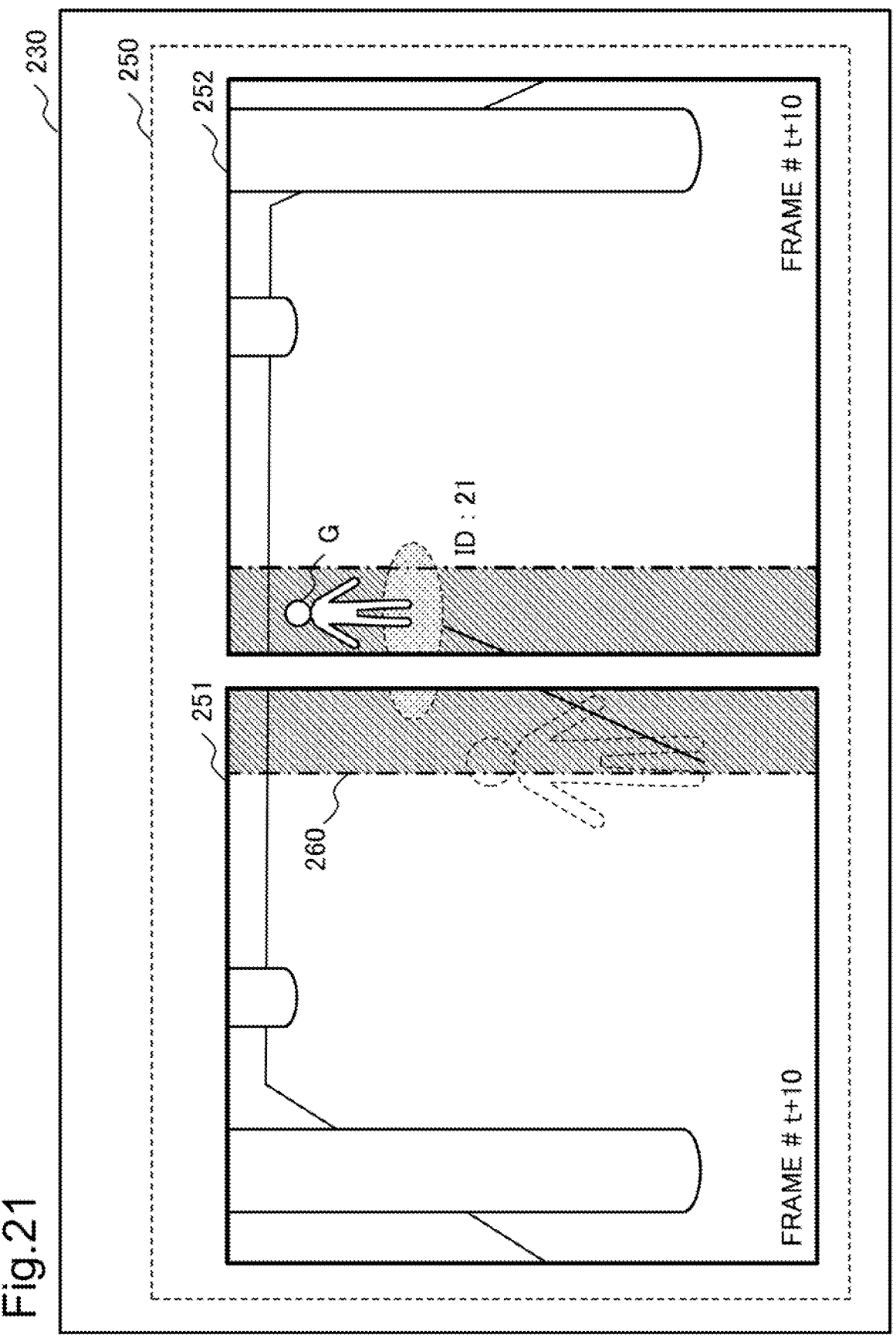
FIG. 21 is a conceptual diagram illustrating an example of display information displayed on a screen of a display device connected to a terminal device included in the tracking system according to the second example embodiment.

FIGS. 20 and 21 are display examples of display information in a case where the proximity range in the real space is set to the image frame. In FIGS. 20 and 21, the tracking image related to the image frame constituting each of the two pieces of video data having the proximity range in the real space is displayed in each of the first display region 251 and the second display region 252. It is assumed that these two pieces of video data are imaged by different monitoring cameras 210. FIG. 20 illustrates an example in which the tracking image with the frame #t is displayed in the image display region 250. FIG. 21 illustrates an example in which the tracking image with the frame #t+10 subsequent to the frame #t is displayed in the image display region 250. A right side portion of the tracking image displayed in the first display region 251 and a left side portion of the tracking image displayed in the second display region 252 are the proximity range in the real space. It is assumed that the tracking target G moves from a position of the tracking target G in the tracking image displayed in the first display region 251 illustrated in FIG. 20 toward a position of the tracking target G in the tracking image displayed in the second display region 252 illustrated in FIG. 21.

FIG. 20 illustrates a state in which a proximity range 260 of the first display region 251 and the second display region 252 is selected in the image display region 250 according to the user's operation using a pointer 265. In the proximity range 260, the position coordinates in the real space are used for calculation, and the collation range associated with the tracking target is set.

As illustrated in FIG. 20, in the frame #t, the tracking target G is included in the tracking image displayed in the first display region 251. In the tracking target G, position coordinates, in the real space, in the proximity range 260 are used for calculation, and a collation range over the first display region 251 and the second display region 252 is set in association with the tracking target G. An identification number 21 is assigned to the tracking target G. As illustrated in FIG. 21, in the frame #t+10, the tracking target G is included in the tracking image displayed in the second display region 252. In the tracking target G, position coordinates, in the real space, in the proximity range 260 are used for calculation, and a collation range over the first display region 251 and the second display region 252 is set in association with the tracking target G. An identification number 21 is assigned to the tracking target G. As described above, when there is a proximity portion in the real space imaged by different monitoring cameras 210 and the proximity range is set between the image frames, the same identification number can be assigned to the same tracking target in different image frames. In the videos captured by different monitoring cameras 210, when the same identification number is assigned to the same tracking target, it is easy to keep tracking the tracking target between monitoring cameras 210.

Operation

Next, the operation of the tracking device 20 according to the present example embodiment will be described with reference to the drawings. Here, a process of generating display information for each verification frame (display information generation process) and a process of setting a collation range according to a user's operation (collation range setting process) will be described.

[Display Information Generation Process]

Figure 22:
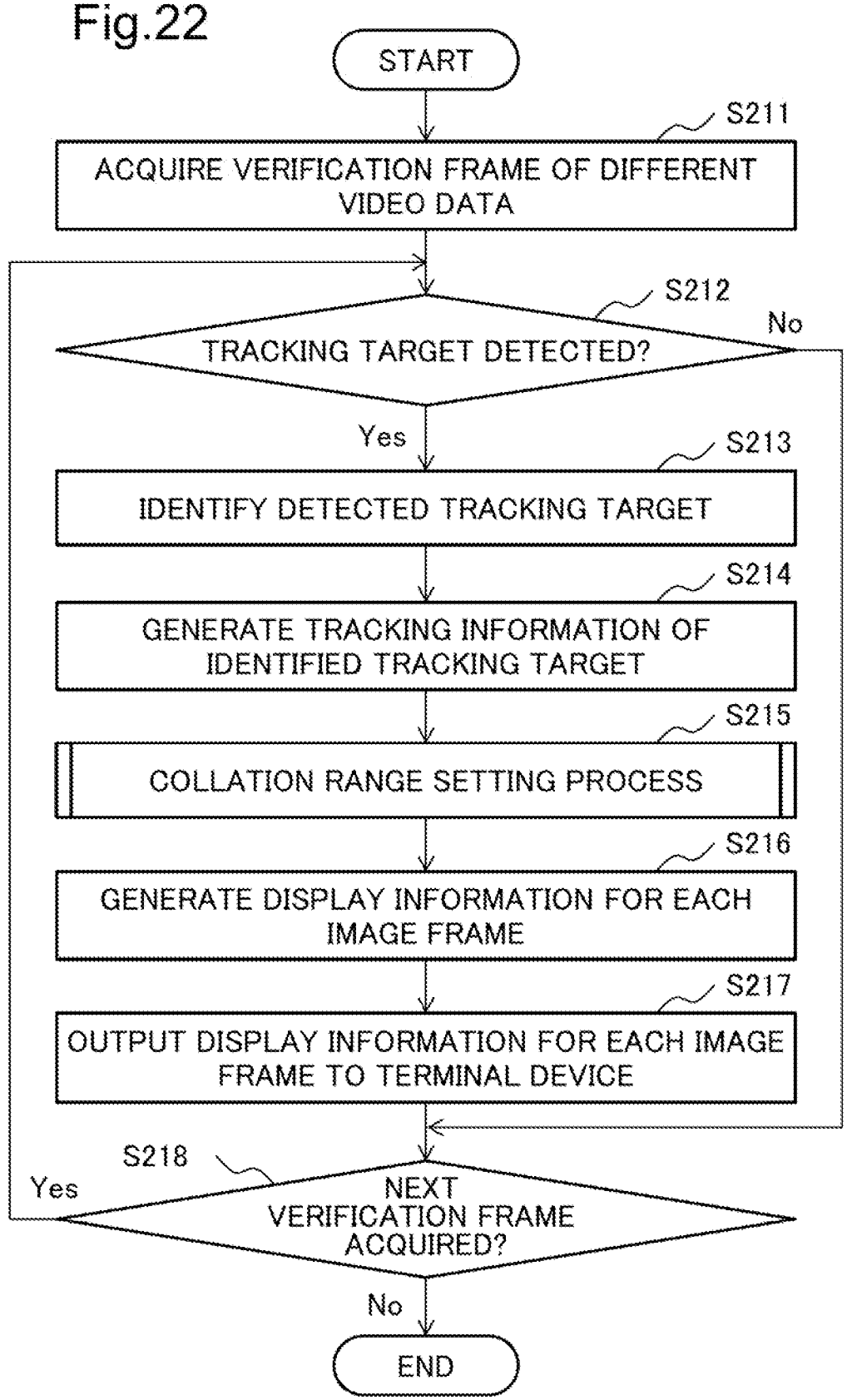
FIG. 22 is a flowchart illustrating an example of operation of the tracking device included in the tracking system according to the second example embodiment.

FIG. 22 is a flowchart for explaining a display information generation process by the tracking device 20. In the process along the flowchart of FIG. 22, the tracking device 20 performs the main operation.

In FIG. 22, first, the tracking device 20 acquires at least two verification frames constituting video data imaged at the same timing by different monitoring cameras 210 (step S211).

Next, the tracking device 20 verifies the presence or absence of the tracking target in the acquired verification frame (step S212). When the tracking target is detected in the verification frame (Yes in step S212), the tracking device 20 identifies the detected tracking target (step S213). On the other hand, when the tracking target has not been detected in the verification frame (No in step S212), the process proceeds to step S218.

After step S213, the tracking device 20 generates tracking information of the identified tracking target (step S214).

Next, the tracking device 20 executes a collation range setting process of setting a collation range in association with the tracking target based on the tracking information for each tracking target (step S215). Details of the collation range setting process will be described with reference to the flowchart of FIG. 23.

Next, the tracking device 20 generates display information for each image frame (step S216).

Next, the tracking device 20 outputs the display information for each image frame to the terminal device 220 (step S217).

Here, when the next verification frame is acquired (Yes in step S218), the process returns to step S212. On the other hand, when the next verification frame has not been acquired (No in step S218), the process according to the flowchart of FIG. 22 ends. When the process according to the flowchart of FIG. 22 ends, the tracking device 20 enters a standby state until the next verification frame is acquired.

[Collation Range Setting Process]

Figure 23:
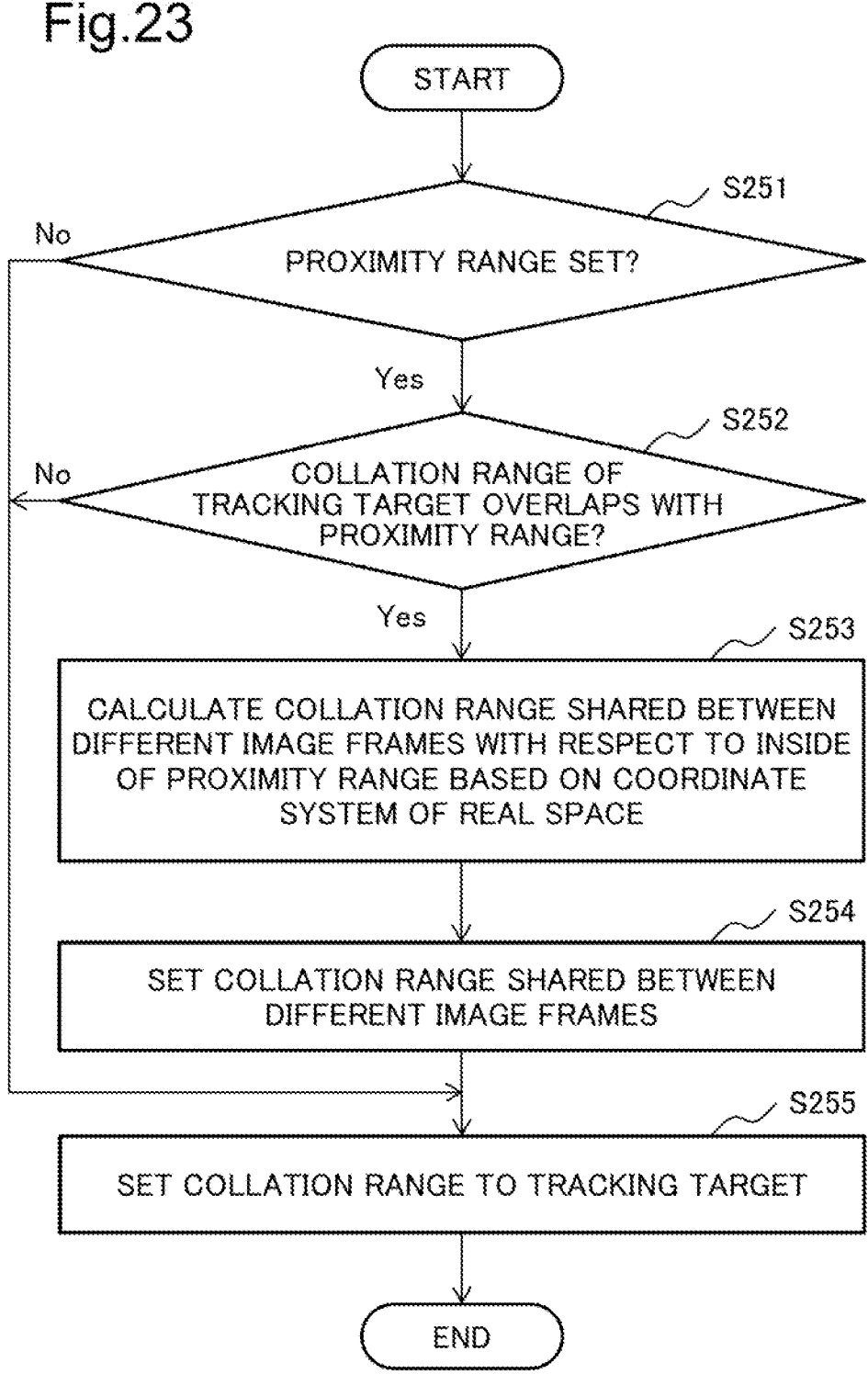
FIG. 23 is a flowchart illustrating an example of a collation range setting process by the tracking device included in the tracking system according to the second example embodiment.

FIG. 23 is a flowchart for explaining the collation range setting process by the tracking device 20. The collation range setting process is a collation range setting process of step S215 of the flowchart of FIG. 22. In the process along the flowchart of FIG. 23, the tracking device 20 performs the main operation.

In FIG. 23, first, the tracking device 20 checks whether a proximity range is set (step S251). When the proximity range is set (Yes in step S251), the tracking device 20 verifies whether there is a portion, of the collation range of the tracking target, overlapping with the proximity range (step S252). On the other hand, when the proximity range is not set (No in step S251), the process proceeds to step S255.

When there is a portion, of the collation range of the tracking target, overlapping with the proximity range (Yes in step S252), the tracking device 20 calculates a collation range shared between different image frames with respect to the inside of the proximity range based on the coordinate system of the real space (step S253). On the other hand, when there is no portion, of the collation range of the tracking target, overlapping with the proximity range (No in step S252), the process proceeds to step S255.

After step S253, the tracking device 20 sets a collation range shared between different image frames (step S254).

Then, the tracking device 20 sets the collation range in association with the tracking target (step S255). After step S255, the process proceeds to step S216 in the flowchart of FIG. 22.

As described above, the tracking system of the present example embodiment includes the tracking device, the plurality of monitoring cameras, and the terminal device. The plurality of monitoring cameras images the range to be monitored and generates video data. The terminal device is connected to a display device having a screen for displaying display information generated by the tracking device.

The tracking device includes a video acquisition unit, a video storage unit, a tracking unit, a display information generation unit, a display information output unit, and a designation range acquisition unit. The video acquisition unit acquires video data. The video storage unit stores the video data acquired by the video acquisition unit. The designation range acquisition unit acquires the designation range designated for each of the plurality of image frames constituting the video data. The tracking unit extracts an image frame to be verified from the video data, detects a tracking target for each extracted image frame, sets a collation range for the detected tracking target, and adjusts the collation range based on a designation range set for each image frame. The display information generation unit generates, for each image frame, a tracking image in which the tracking target is associated with the collation range.

In an aspect of the present example embodiment, the designation range acquisition unit acquires, as the designation range, a proximity range in the real space designated in at least two image frames. The tracking unit uses the position coordinates, of the real space, in the proximity range for calculation, sets the collation range in at least two image frames, and associates the collation range set in the at least two image frames with the tracking target.

In an aspect of the present example embodiment, the terminal device sets an image display region in which at least one tracking image is displayed on a screen of a display device. The terminal device receives designation of a designation range in the tracking image displayed in the image display region to output the designation range designated in the tracking image to the tracking device. The terminal device acquires the tracking image updated based on the setting of the designation range from the tracking device, and displays the updated tracking image on the screen of the display device. For example, the terminal device displays at least two tracking images in the image display region, receives designation of a proximity range over the at least two tracking images, and outputs, as the designation range, the proximity range designated in the at least two tracking images to the tracking device.

According to the present example embodiment, since the collation range overlapping with the proximity range designated in at least two image frames imaged by different monitoring cameras is adjusted in accordance with the scene in the real space, it is possible to track the tracking target with high accuracy in accordance with the scene in the real space. For example, according to the present example embodiment, in a case where the visual fields overlap between videos captured by different monitoring cameras, it is possible to intuitively designate a common portion between the different videos without complicated calculation.

Third Example Embodiment

Next, a tracking device according to the third example embodiment will be described with reference to the drawings. The tracking device of the present example embodiment has a simplified configuration of the tracking devices of the first and second example embodiments.

Figure 24:
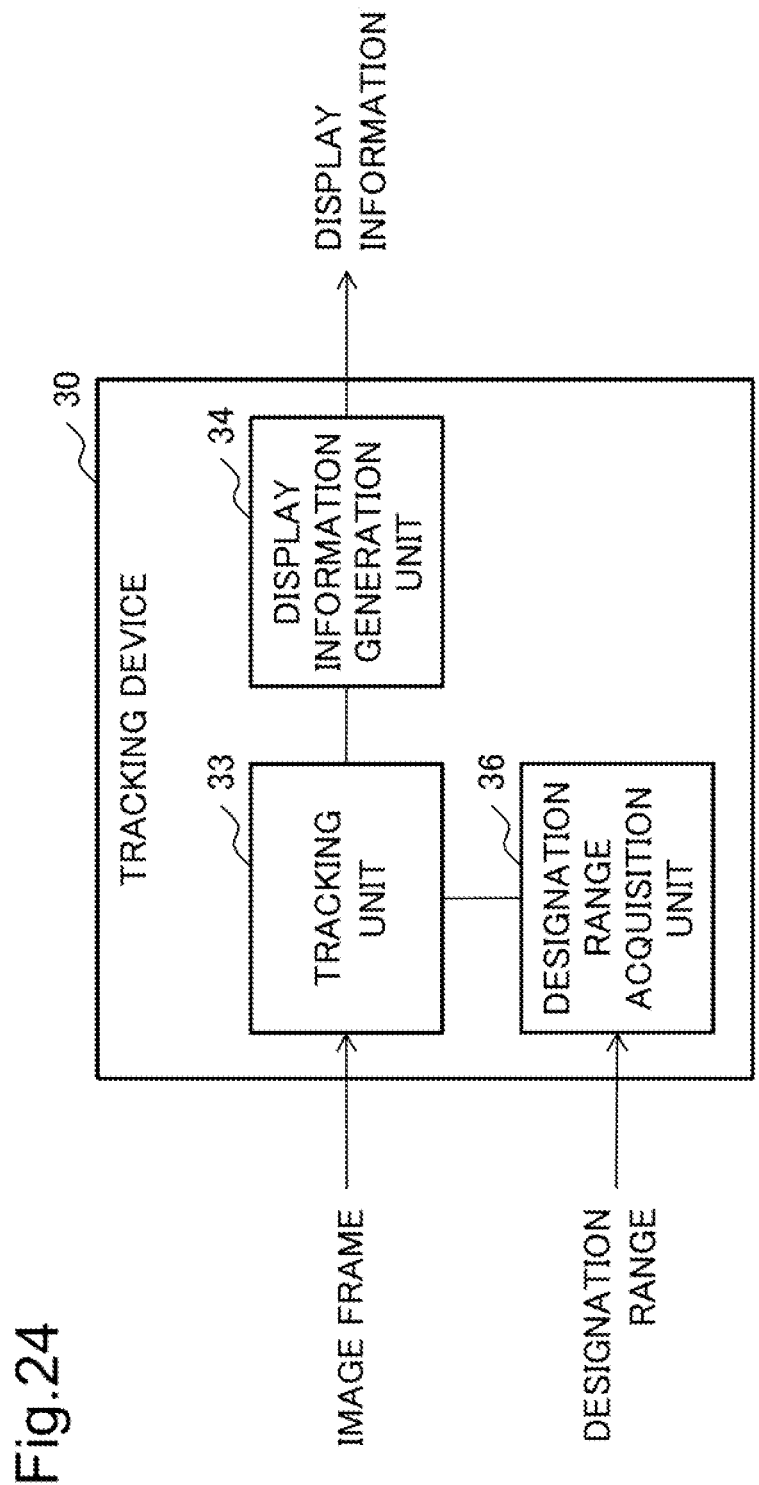
FIG. 24 is a block diagram illustrating an example of a configuration of a tracking device according to a third example embodiment.
Figure 25:
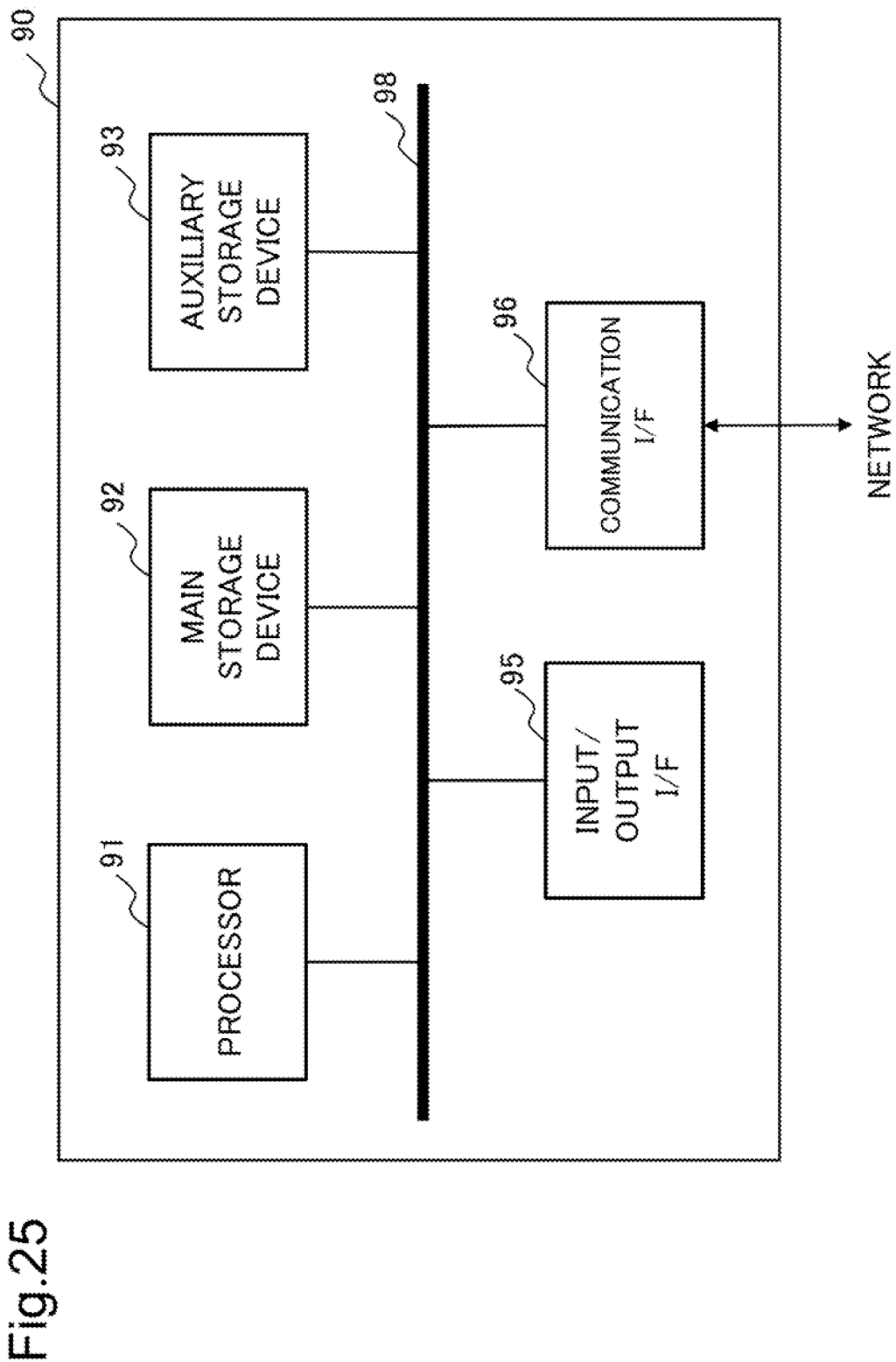
FIG. 25 is a block diagram illustrating an example of a hardware configuration of a tracking device, a terminal device, and the like according to each example embodiment.

FIG. 24 is a block diagram illustrating an example of a configuration of a tracking device 30 according to the present example embodiment. The tracking device 30 includes a tracking unit 33, a display information generation unit 34, and a designation range acquisition unit 36.

The designation range acquisition unit 36 acquires the designation range designated for each of the plurality of image frames constituting the video data. The tracking unit 33 extracts an image frame to be verified from the video data, detects a tracking target for each extracted image frame, sets a collation range for the detected tracking target, and adjusts the collation range based on a designation range set for each image frame. The display information generation unit 34 generates, for each image frame, a tracking image in which the collation range is associated with the tracking target.

As described above, the tracking device according to the present example embodiment includes the tracking unit, the display information generation unit, and the designation range acquisition unit. The designation range acquisition unit acquires the designation range designated for each of the plurality of image frames constituting the video data. The tracking unit extracts an image frame to be verified from the video data, detects a tracking target for each extracted image frame, sets a collation range for the detected tracking target, and adjusts the collation range based on a designation range set for each image frame. The display information generation unit generates, for each image frame, a tracking image in which the tracking target is associated with the collation range.

According to the present example embodiment, since the collation range for each tracking target is adjusted in accordance with the scene in the real space, it is possible to accurately track the tracking target in accordance with the scene in the real space.

(Hardware)

Here, a hardware configuration for achieving the tracking device and the terminal device according to each example embodiment of the present invention will be described using a computer 90 of FIG. 23 as an example. The computer 90 in FIG. 23 is a configuration example for achieving the tracking device and the terminal device of each example embodiment, and does not limit the scope of the present invention.

As illustrated in FIG. 23, the computer 90 includes a processor 91, a main storage device 92, an auxiliary storage device 93, an input/output interface 95, and a communication interface 96. In FIG. 23, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92 and executes the developed program. In the present example embodiment, a software program installed in the computer 90 may be used. The processor 91 executes process by the tracking device or the terminal device of the present example embodiment.

The main storage device 92 has an area in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various pieces of data. The auxiliary storage device 93 includes a local disk such as a hard disk or a flash memory. Various pieces of data may be stored in the main storage device 92, and the auxiliary storage device 93 may be omitted.

The input/output interface 95 is an interface that connects the computer 90 and a peripheral device. The communication interface 96 is an interface that connects to an external system or a device through a network such as the Internet or an intranet in accordance with a standard or a specification. The input/output interface 95 and the communication interface 96 may be shared as an interface connected to an external device.

An input device such as a keyboard, a mouse, or a touch panel may be connected to the computer 90 as necessary. These input devices are used to input of information and settings. When the touch panel is used as the input device, the screen of the display device may also serve as the interface of the input device. Data communication between the processor 91 and the input device may be mediated by the input/output interface 95.

The computer 90 may be provided with a display device that displays information. When a display device is provided, the computer 90 preferably includes a display control device (not illustrated) for controlling display of the display device. The display device may be connected to the computer 90 via the input/output interface 95.

The above is an example of a hardware configuration for enabling the tracking device and the terminal device of each example embodiment. The hardware configuration of FIG. 23 is an example of a hardware configuration for achieving the tracking device and the terminal device of each example embodiment, and does not limit the scope of the present invention. A program for causing a computer to execute process related to the tracking device and the terminal device of each example embodiment is also included in the scope of the present invention. Furthermore, a recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card, a magnetic recording medium such as a flexible disk, or another recording medium. When the program executed by the processor is recorded in the recording medium, the recording medium corresponds to the recording medium.

The components of the tracking device and the terminal device of each example embodiment can be arbitrarily combined. The components of the tracking device and the terminal device of each example embodiment may be implemented by software or may be implemented by a circuit.

While the present invention is described with reference to example embodiments thereof, the present invention is not limited to these example embodiments. Various modifications that can be understood by those skilled in the art can be made to the configuration and details of the present invention within the scope of the present invention.

REFERENCE SIGNS LIST 1 tracking system
10, 20 tracking device
11 video acquisition unit
12 video storage unit
13, 23 tracking unit
14, 24 display information generation unit
15 display information output unit
16, 26 designation range acquisition unit
110 monitoring camera
120 terminal device
121 display information acquisition unit
122 display information storage unit
123 display unit
124 input unit
127 input device
130 display device

The invention claimed is:

1. A tracking device comprising:
at least one memory storing instructions; and
at least one processor connected to the at least one memory and configured to execute the instructions to:
  acquire a designation range designated for each of a plurality of image frames constituting video data;
  extract the plurality of image frames to be verified from the video data;
  detect a tracking target from the plurality of image frames;
  set a collation range for the detected tracking target for each of the plurality of image frames;
  adjust the collation range based on the designation range set for each of the plurality of image frames;
  generate, for each of the plurality of image frames, a tracking image in which the collation range is associated with the tracking target;
  acquire, as the designation range, an exclusion range designated on a screen displaying the image frame; and
  perform setting for the tracking target by moving the collation range overlapping with the exclusion range to a position opposite to a position of the collation range with respect to the exclusion range.

2. The tracking device according to claim 1, wherein the at least one processor is configured to execute the instructions to:
designate the exclusion range in the image frame based on a feature amount extracted from the image frame.

3. The tracking device according to claim 1, wherein the at least one processor is configured to execute the instructions to:
acquire a proximity range in a real space designated in at least two of the image frames;
set the collation range in the at least two of the image frames by using position coordinates, of a real space, in the proximity range for calculation; and
associate the collation range set in the at least two of the image frames with the tracking target.

4. A tracking system comprising:
the tracking device according to claim 1;
at least one monitoring camera configured to image a range to be monitored and to generate the video data; and
a terminal device connected to a display device having a screen configured to display the tracking image generated by the tracking device.

5. The tracking system according to claim 4, wherein the terminal device comprises:
at least one memory storing instructions; and
at least one processor connected to the at least one memory and configured to execute the instructions to:
set an image display region in which at least one of the tracking images is displayed on a screen of the display device;
receive designation of the designation range in the tracking image displayed in the image display region;
output the designation range designated in the tracking image to the tracking device;
acquire, from the tracking device, the tracking image updated based on setting of the designation range; and
display the updated tracking image on a screen of the display device.

6. The tracking system according to claim 5, wherein the at least one processor is configured to execute the instructions to:
display at least one of the tracking images in the image display region;
receive designation of the exclusion range in the tracking image; and
output, as the designation range, the exclusion range designated in the tracking image to the tracking device.

7. The tracking system according to claim 5, wherein the at least one processor is configured to execute the instructions to:
display at least two of the tracking images in the image display region;
receive designation of a proximity range over the at least two of the tracking images; and
output the proximity range designated in the at least two of the tracking images to the tracking device.

8. A tracking method executed by a computer, the method comprising:
acquiring a designation range designated for each of a plurality of image frames constituting video data;
extracting the plurality of image frames to be verified from the video data;
detecting a tracking from the plurality of image frames;
setting a collation range for the detected tracking target for each of the plurality of image frames;
adjusting the collation range based on the designation range set for each of the plurality of image frames; and
generating, for each of the plurality of image frames, a tracking image in which the collation range is associated with the tracking target,
wherein the acquiring includes acquiring, as the designation range, an exclusion range designated on a screen displaying the image frame, and
wherein the setting includes performing setting for the tracking target by moving the collation range overlapping with the exclusion range to a position opposite to a position of the collation range with respect to the exclusion range.

9. A non-transitory recording medium storing a program for causing a computer to execute:
a process of acquiring a designation range designated for each of a plurality of image frames constituting video data;
a process of extracting the plurality of image frames to be verified from the video data;
a process of detecting a tracking target from the plurality of image frames;
a process of setting a collation range for the detected tracking target for each of the plurality of image frames;
a process of adjusting the collation range based on the designation range set for each of the plurality of image frames; and
a process of generating, for each of the plurality of image frames, a tracking image in which the collation range is associated with the tracking target,
wherein the process of acquiring includes a process of acquiring, as the designation range, an exclusion range designated on a screen displaying the image frame, and
wherein the process of setting includes a process of performing setting for the tracking target by moving the collation range overlapping with the exclusion range to a position opposite to a position of the collation range with respect to the exclusion range.

* * * * *